(12) United States Patent
Iwamura et al.

(10) Patent No.: US 12,287,126 B2
(45) Date of Patent: *Apr. 29, 2025

(54) HEAT UTILIZATION SYSTEM AND HEAT GENERATING DEVICE

(71) Applicant: CLEAN PLANET INC., Tokyo (JP)

(72) Inventors: Yasuhiro Iwamura, Sendai (JP); Takehiko Ito, Tokyo (JP); Jirota Kasagi, Sendai (JP); Hideki Yoshino, Tokyo (JP); Shotaro Hirano, Tokyo (JP); Masahide Ise, Tokyo (JP); Tetsuharu Ibaraki, Tokyo (JP)

(73) Assignee: CLEAN PLANET INC., Tokyo (JP)

( * ) Notice: Subject to any disclaimer, the term of this patent is extended or adjusted under 35 U.S.C. 154(b) by 909 days.

This patent is subject to a terminal disclaimer.

(21) Appl. No.: 17/311,820

(22) PCT Filed: Dec. 11, 2019

(86) PCT No.: PCT/JP2019/048395
§ 371 (c)(1),
(2) Date: Jun. 8, 2021

(87) PCT Pub. No.: WO2020/122097
PCT Pub. Date: Jun. 18, 2020

(65) Prior Publication Data
US 2022/0026113 A1    Jan. 27, 2022

(30) Foreign Application Priority Data

Dec. 11, 2018 (JP) ................. 2018-232054
May 14, 2019 (JP) ................. 2019-091681
Aug. 19, 2019 (JP) ................. 2019-150030

(51) Int. Cl.
F24V 30/00    (2018.01)
F28D 7/10    (2006.01)
(Continued)

(52) U.S. Cl.
CPC .............. *F24V 30/00* (2018.05); *F28D 7/106* (2013.01); *F28D 20/003* (2013.01); *F28F 1/36* (2013.01); *F28F 2270/00* (2013.01)

(58) Field of Classification Search
None
See application file for complete search history.

(56) References Cited

U.S. PATENT DOCUMENTS 5,560,209 A    10/1996    Kienbock et al.
6,337,146 B1 *  1/2002    Sogabe ............... B01J 20/0229
                                                            428/656
6,823,931 B1    11/2004    Stetson et al.
(Continued)

FOREIGN PATENT DOCUMENTS

CN    2856836 Y    1/2007
JP    4-12377 Y2    3/1992
(Continued)

OTHER PUBLICATIONS

Abstract Translation of JP 2000-042388 A (Year: 2000).*
(Continued)

*Primary Examiner* — Kevin M Bernatz
(74) *Attorney, Agent, or Firm* — Muncy, Geissler, Olds & Lowe, P.C.

(57) ABSTRACT

A heat utilization system according to the invention includes: a sealed container into which a hydrogen-based gas is supplied; a heat generating structure that is accommodated in the sealed container and includes a heat generating element that is configured to generate heat by occluding and discharging hydrogen contained in the hydrogen-based gas; and a heat utilization device that utilizes, as a heat source, a heat medium heated by the heat of the heat generating element. The heat generating element includes a base made of a hydrogen storage metal, a hydrogen storage alloy, or a proton conductor, and a multilayer film provided on the base. The multilayer film has a first layer made of a
(Continued)

hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm.

12 Claims, 22 Drawing Sheets

(51) Int. Cl.
*F28D 20/00* (2006.01)
*F28F 1/36* (2006.01)

(56) References Cited

U.S. PATENT DOCUMENTS

| | | | | |
|---|---|---|---|---|
| 9,038,390 | B1* | 5/2015 | Kreuger | F03G 6/005 60/670 |
| 11,499,789 | B2* | 11/2022 | Iwamura | F01K 3/188 |
| 11,971,199 | B2* | 4/2024 | Iwamura | F25B 30/04 |
| 2002/0098396 | A1* | 7/2002 | Kobayashi | H01M 8/04268 429/436 |
| 2005/0145378 | A1* | 7/2005 | Mori | F17C 11/005 165/157 |
| 2007/0033825 | A1 | 2/2007 | Lo | |
| 2008/0166573 | A1* | 7/2008 | Shinozawa | C01B 3/0026 428/457 |
| 2008/0216479 | A1* | 9/2008 | Romanelli | F01K 25/10 60/671 |
| 2012/0255304 | A1* | 10/2012 | Li | F01K 17/02 60/670 |
| 2013/0028791 | A1 | 1/2013 | Uchiyama | |
| 2015/0308676 | A1 | 10/2015 | Lee et al. | |
| 2016/0017800 | A1 | 1/2016 | Simpson | |
| 2018/0145312 | A1* | 5/2018 | Koike | H01M 4/623 |
| 2018/0233753 | A1* | 8/2018 | Jang | H01M 8/04335 |
| 2019/0257551 | A1 | 8/2019 | Iwamura et al. | |
| 2020/0002163 | A1* | 1/2020 | Dowaki | F17C 11/005 |
| 2023/0003461 | A1* | 1/2023 | Kobayashi | F28D 20/003 |
| 2023/0152009 | A1* | 5/2023 | Iwamura | G21B 3/00 126/263.01 |
| 2024/0240836 | A1* | 7/2024 | Sato | C01B 3/0084 |
| 2024/0255192 | A1* | 8/2024 | Iwamura | C01B 3/0031 |

FOREIGN PATENT DOCUMENTS

| | | | | |
|---|---|---|---|---|
| JP | H07198106 | A | 8/1995 | |
| JP | H08-240106 | A | 9/1996 | |
| JP | 10122695 | A * | 5/1998 | |
| JP | 2000042388 | A * | 2/2000 | |
| JP | 2001-289396 | A | 10/2001 | |
| JP | 2001349638 | A * | 12/2001 | F02C 6/18 |
| JP | 2002069502 | A * | 3/2002 | C01B 3/0005 |
| JP | 2002161998 | A * | 6/2002 | |
| JP | 2003521640 | A | 7/2003 | |
| JP | 2004077200 | A | 3/2004 | |
| JP | 2004-317047 | A | 11/2004 | |
| JP | 2015513531 | A | 5/2015 | |
| JP | 2015536894 | A | 12/2015 | |
| JP | 2016142495 | A * | 8/2016 | |
| JP | 2019133803 | A * | 8/2019 | |
| KR | 10-2011-0135626 | A | 12/2011 | |
| KR | 10-2013-0032868 | A | 4/2013 | |
| WO | 0077266 | A1 | 12/2000 | |
| WO | 2018062115 | A1 | 4/2018 | |
| WO | 2018230447 | A1 | 12/2018 | |

OTHER PUBLICATIONS

JP 2019133803 A Abstract (Year: 2019).*
JP 2016142495 A Abstract (Year: 2016).*
JP 10122695 A Abstract (Year: 1998).*
JP 2001-349638 A Abstract (Year: 2001).*
JP 2002-069502 A Abstract (Year: 2002).*
JP 2002-161998 A Abstract (Year: 2002).*
Office Action of the corresponding CN application No. 201980081164.2 mailed May 31, 2023.
The extended European search report for the corresponding EP application No. 19896824.0 mailed Aug. 2, 2022.
A. Kitamura. et.al, Brief summary of latest experimental results with a mass-flow calorimetry system for anomalous heat effect of nano-composite metals under D(H)-gas charging, Current Science, vol. 108, No. 4, p. 589-593, 2015.
Office Action of the corresponding KR application No. 10-2021-7021290 mailed May 14, 2024 and English translation thereof.

* cited by examiner

HEAT UTILIZATION SYSTEM AND HEAT GENERATING DEVICE

TECHNICAL FIELD

The present invention relates to a heat utilization system and a heat generating device.

BACKGROUND ART

In recent years, a heat generation phenomenon in which heat is generated by occluding and discharging hydrogen using a hydrogen storage metal or the like is reported (see, for example, Non-PTL 1). Hydrogen can be generated from water and is thus inexhaustible and inexpensive as a resource, and does not generate a greenhouse gas such as carbon dioxide and is thus clean energy. Unlike a nuclear fission reaction, the heat generation phenomenon using the hydrogen storage metal or the like is safe since there is no chain reaction. Heat generated by occluding and discharging hydrogen can be utilized as it is, and can be further utilized by being converted into electric power. Therefore, the heat is expected as an effective heat energy source.

CITATION LIST

Non-Patent Literature

Non-PTL 1: A. Kitamura. et. al "Brief summary of latest experimental results with a mass-flow calorimetry system for anomalous heat effect of nano-composite metals under D(H)-gas charging" CURRENT SCIENCE, VOL. 108, NO. 4, p. 589-593, 2015

SUMMARY OF INVENTION

Technical Problem

However, a heat energy source is still mainly obtained from thermal power generation or nuclear power generation. Therefore, from the viewpoint of environmental problems and energy problems, there is a demand for a novel heat utilization system and heat generating device that utilize an inexpensive, clean, and safe heat energy source and that have not been disclosed in the related art.

Therefore, an object of the invention is to provide a novel heat utilization system and heat generating device that utilize an inexpensive, clean, and safe heat energy source.

Solution to Problem

A heat utilization system according to the invention includes: a sealed container into which a hydrogen-based gas is supplied; a heat generating structure that is accommodated in the sealed container and includes a heat generating element that is configured to generate heat by occluding and discharging hydrogen contained in the hydrogen-based gas; and a heat utilization device that utilizes, as a heat source, a heat medium heated by the heat of the heat generating element. The heat generating element includes a base made of a hydrogen storage metal, a hydrogen storage alloy, or a proton conductor, and a multilayer film provided on the base. The multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm.

A heat generating device according to the invention includes: a sealed container into which a hydrogen-based gas is supplied; and a heat generating structure that is accommodated in the sealed container and in which a plurality of heat generating elements that are configured to generate heat by occluding and discharging hydrogen contained in the hydrogen-based gas are radially arranged. The heat generating element includes a base made of a hydrogen storage metal, a hydrogen storage alloy, or a proton conductor, and a multilayer film provided on the base. The multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm.

Another heat utilization system according to the invention includes: a sealed container into which a hydrogen-based gas is supplied; a heat generating structure that is accommodated in the sealed container and includes a heat generating element that is configured to generate heat by occluding and discharging hydrogen contained in the hydrogen-based gas; a combustion device that is configured to combust fuel and combustion air to generate heat; and a heat utilization device that is configure to preheat the combustion air by using the heat of the heat generating element. The heat generating element includes a base made of a hydrogen storage metal, a hydrogen storage alloy, or a proton conductor, and a multilayer film provided on the base. The multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm.

Advantageous Effect

According to the invention, since the heat generating element that generates heat by occluding and discharging hydrogen is utilized as a heat energy source, inexpensive, clean, and safe energy can be supplied.

DESCRIPTION OF EMBODIMENTS

1. First Embodiment

Figure 1:
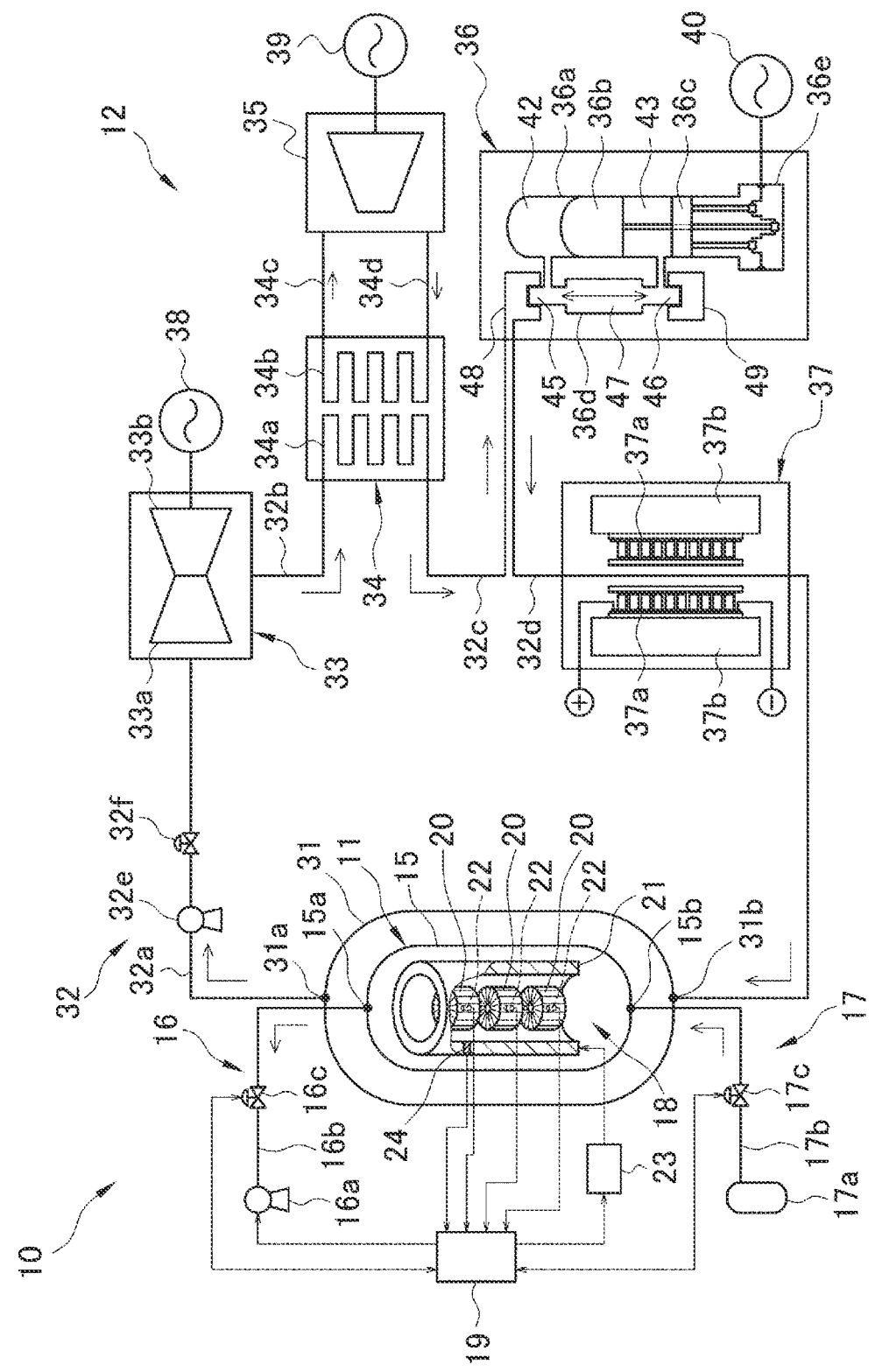
FIG. 1 is a schematic diagram showing a heat utilization system according to a first embodiment.

As shown in FIG. 1, a heat utilization system. 10 includes a heat generating device 11 and a heat utilization device 12. The heat utilization system 10 heats a heat medium to be described later by heat generated by the heat generating device 11, and operates the heat utilization device 12 using the heated heat medium as a heat source.

The heat generating device 11 includes a sealed container 15, a gas exhaust unit 16, a gas supply unit 17, a heat generating module 18, and a control unit 19.

The sealed container 15 is a hollow container, and accommodates the heat generating module 18 therein. The sealed container 15 is made of stainless steel or the like. The sealed container 15 has an exhaust port 15a connected to an exhaust pipe 16b to be described later and a supply port 15b connected to a supply pipe 17b to be described later. The sealed container 15 includes, for example, a tubular container body (not shown), an upper lid (not shown) provided at an upper end of the container body, and a lower lid (not shown) provided at a lower end of the container body. In this example, the exhaust port 15a is formed in the upper lid, and the supply port 15b is formed in the lower lid. Inner surfaces of the container body, the upper lid, and the lower lid form a space inside the sealed container 15. A hydrogen-based gas, which will be described later, is supplied to the sealed container 15 through the supply pipe 17b and the supply port 15b.

The gas exhaust unit 16 vacuum-evacuates the inside of the sealed container 15. The gas exhaust unit 16 includes a vacuum pump 16a, the exhaust pipe 16b, and an exhaust valve 16c. The vacuum pump 16a is formed of, for example, a turbo molecular pump and a dry pump. The exhaust pipe 16b connects the vacuum pump 16a and the sealed container 15. The exhaust pipe 16b circulates the gas inside the sealed container 15 to the vacuum pump 16a. The exhaust valve 16c is provided in the exhaust pipe 16b. The exhaust valve 16c adjusts a flow rate of the gas circulating through the exhaust pipe 16b. The vacuum pump 16a and the exhaust valve 16c are electrically connected to the control unit 19. An exhaust speed of the gas exhaust unit 16 can be controlled by, for example, adjusting a rotation speed of the turbo molecular pump.

The gas supply unit 17 supplies the hydrogen-based gas into the sealed container 15. The gas supply unit 17 includes a gas cylinder 17a, the supply pipe 17b, and a supply valve 17c. The gas cylinder 17a is a container that stores a hydrogen-based gas at a high pressure. The supply pipe 17b connects the gas cylinder 17a and the sealed container 15. The supply pipe 17b circulates the hydrogen-based gas stored in the gas cylinder 17a to the sealed container 15. The supply valve 17c is provided in the supply pipe 17b. The supply valve 17c adjusts the flow rate of the hydrogen-based gas circulating through the supply pipe 17b. The supply valve 17c is electrically connected to the control unit 19. The hydrogen-based gas is a gas containing isotopes of hydrogen. As the hydrogen-based gas, at least one of a deuterium gas and a protium gas is used. The protium gas includes a mixture of naturally occurring protium and deuterium, that is, a mixture in which an abundance ratio of protium is 99.985% and an abundance ratio of deuterium is 0.015%. In the following description, when the protium and the deuterium are not distinguished from each other, both are referred to as "hydrogen".

The heat generating module 18 is accommodated in the sealed container 15. The heat generating module 18 includes a heat generating structure 20 containing a hydrogen storage metal or a hydrogen storage alloy, and a heater 21 that heats the heat generating structure 20. The heat generating structure 20 occludes hydrogen contained in the hydrogen-based gas and is heated by the heater 21, so that heat equal to or higher than a heating temperature of the heater 21 (hereinafter, referred to as excess heat) is generated. The heat generating module 18 brings a temperature of the heat medium, which will be described later, to a temperature within a range of, for example, 50° C. or higher and 1500° C. or lower by the excess heat. In this example, the heat generating module 18 heats the heat medium to 1500° C.

The heat generating module 18 may include one or more heat generating structures 20 and one or more heaters 21. The heat generating module 18 includes at least one heat generating structure 20 and at least one heater 21, and the number of heat generating structures 20 and the number of heaters 21 can be appropriately changed. In the present embodiment, the heat generating module 18 includes three heat generating structures 20 and one heater 21. A detailed structure of the heat generating module 18 will be described later with reference to other drawings.

A plurality of heat generating structures 20 are arranged in a direction in which the hydrogen-based gas flows inside the sealed container 15. The "direction in which the hydrogen-based gas flows" inside the sealed container 15 is a direction in which a main flow of the hydrogen-based gas flows, and is, for example, a direction from the supply port 15b of the sealed container 15 toward the exhaust port 15a, that is, a direction from a lower side to an upper side of the sealed container 15. The heat generating structures 20 are arranged with a gap from each other.

Figure 3:
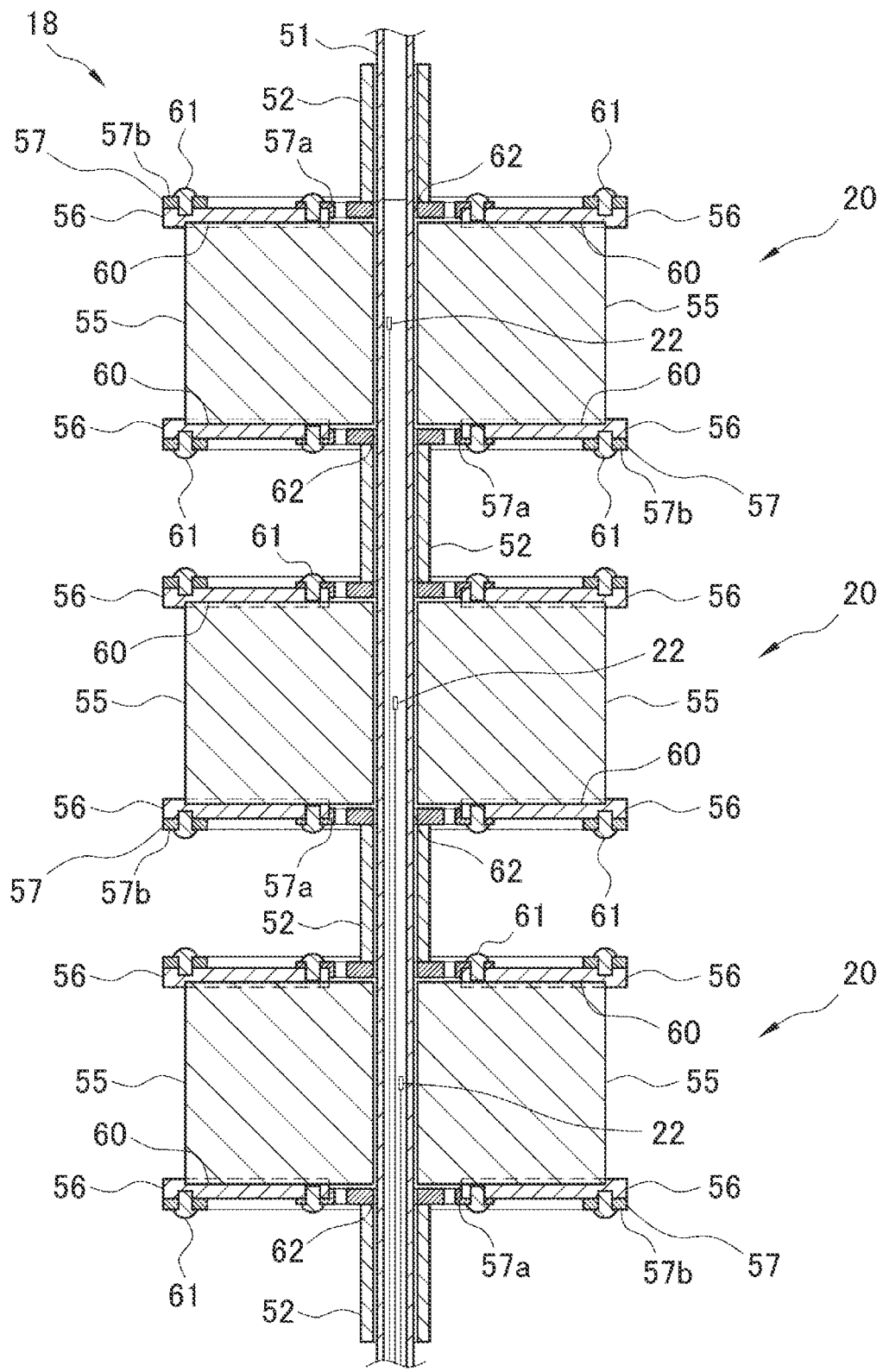
FIG. 3 is a cross-sectional view showing the structure of the heat generating module.

The heat generating structure 20 is provided with a temperature sensor 22 (see FIGS. 1 and 3). The temperature sensor 22 is provided in each of the heat generating structures 20. The temperature sensor 22 detects a temperature of the corresponding heat generating structure 20. Among the three heat generating structures 20, the lower-stage heat generating structure 20 comes into contact with the heat medium supplied from the supply port 15b, and thus has the lowest temperature. Since the middle-stage heat generating structure 20 comes into contact with the heat medium heated by passing through the lower-stage heat generating structure 20, the temperature of the middle-stage heat generating structure 20 is higher than that of the lower-stage heat generating structure 20. Since the upper-stage heat generating structure 20 comes into contact with the heated heat medium by passing through the middle-stage heat generating structure 20, the temperature of the upper-stage heat generating structure 20 is higher than that of the middle-stage heat generating structure 20. That is, the heat generating structure 20 has a low temperature, a medium temperature, and a high temperature in the order of the lower-stage, the middle-stage, and the upper-stage. As the temperature sensor 22, for example, a thermocouple is used. The temperature sensor 22 is electrically connected to the control unit 19, and outputs, to the control unit 19, a signal corresponding to the detected temperature.

The heater 21 is an electric furnace formed in a tubular shape. In this example, the heater 21 is formed in a cylindrical shape. Each heat generating structure 20 is arranged in a space formed by an inner surface of the heater 21. The heater 21 is connected to a power supply 23, and is driven by electric power input from the power supply 23. The power supply 23 is electrically connected to the control unit 19. The heating temperature of the heater 21 is, for example, preferably 300° C. or higher, more preferably 500° C. or higher, and still more preferably 600° C. or higher.

The heater 21 is provided with a temperature sensor 24. The temperature sensor 24 detects the temperature of the heater 21. As the temperature sensor 24, for example, a thermocouple is used. The temperature sensor 24 is electrically connected to the control unit 19, and outputs, to the control unit 19, a signal corresponding to the detected temperature.

The control unit 19 controls an operation of each unit of the heat utilization system 10. The control unit 19 mainly includes, for example, an arithmetic device (a central processing unit), and a storage unit such as a read-only memory and a random access memory. The arithmetic device executes various kinds of arithmetic processings using a program, data, and the like stored in the storage unit.

The control unit 19 is electrically connected to the vacuum pump 16a, the exhaust valve 16c, the supply valve 17c, the power supply 23, the temperature sensor 24, and the temperature sensor 22. For example, the control unit 19 controls the output of the excess heat by adjusting input electric power of the heater 21, a supply amount of the hydrogen-based gas, a pressure of the sealed container 15, and the like based on the temperature of the heat generating structure 20 detected by the temperature sensor 22.

The heat generating device 11 supplies the hydrogen-based gas into the sealed container 15 to cause the heat generating structure 20 to occlude hydrogen contained in the hydrogen-based gas. The heat generating device 11 discharges hydrogen occluded in the heat generating structure 20 by performing vacuum evacuation of the inside of the sealed container 15 and heating of the heat generating structure 20. In this way, the heat generating device 11 generates excess heat by occluding and discharging hydrogen in the heat generating structure 20. That is, a heat generating method using the heat generating device 11 includes a hydrogen occluding step of occluding the hydrogen contained in the hydrogen-based gas into the heat generating structure 20 by supplying the hydrogen-based gas to the inside of the sealed container 15, and a hydrogen discharging step of discharging the hydrogen occluded in the heat generating structure 20 by performing the vacuum evacuation of the inside of the sealed container 15 and the heating of the heat generating structure 20. In practice, the hydrogen occluding step and the hydrogen discharging step are repeatedly performed. In the hydrogen occluding step, water or the like adhering to the heat generating structure 20 may be removed by heating the heat generating structure 20 before the supply of the hydrogen-based gas into the sealed container 15. In the hydrogen discharging step, for example, after the supply of the hydrogen-based gas into the sealed container 15 is stopped, the vacuum evacuation and the heating are performed.

The heat utilization device 12 utilizes, as a heat source, a heat medium heated by the heat of the heat generating structure 20. The heat medium may be a gas or a liquid, and preferably has excellent heat conductivity and chemical stability. Examples of the gas include a helium gas, an argon gas, a hydrogen gas, a nitrogen gas, water vapor, air, and carbon dioxide. Examples of the liquid include water, a molten salt (such as $KNO_3$ (40%)-$NaNO_3$ (60%)), and a liquid metal (such as Pb). Alternatively, the heat medium may be a heat medium having a mixed phase in which solid particles are dispersed in a gas or a liquid. Examples of the solid particles include a metal, a metal compound, an alloy, and ceramics. Examples of the metal include copper, nickel, titanium, and cobalt. Examples of the metal compound include an oxide, a nitride, and a silicide of the above-described metals. Examples of the alloy include stainless steel and chromium molybdenum steel. Examples of the ceramics include alumina. In this example, a helium gas is used as the heat medium.

The heat utilization device 12 includes an accommodation container 31, a heat medium circulation unit 32, a gas turbine 33, a steam generator 34, a steam turbine 35, a Stirling engine 36, and a thermoelectric converter 37. Although the heat utilization device 12 includes the gas turbine 33, the steam generator 34, the steam turbine 35, the Stirling engine 36, and the thermoelectric converter 37 in FIG. 1, the heat utilization device 12 may include any combination of these components.

The accommodation container 31 is a hollow container, and accommodates the sealed container 15 of the heat generating device 11 therein. The accommodation container 31 is made of ceramics, stainless steel, or the like. The material of the accommodation container 31 is preferably a material having an excellent heat insulation property. The accommodation container 31 has an outflow port 31a through which the heat medium flows out and an inflow port 31b through which the heat medium flows in. The heat medium flowing in through the inflow port 31b passes through a gap formed by an inner surface of the accommodation container 31 and an outer surface of the sealed container 15, and flows out through the outflow port 31a.

The heat medium circulation unit 32 circulates the heat medium between an inside and an outside of the accommodation container 31. In the present embodiment, the heat medium circulation unit 32 includes a first pipe 32a that connects the accommodation container 31 and the gas turbine 33, a second pipe 32b that connects the gas turbine 33 and the steam generator 34, a third pipe 32c that connects the steam generator 34 and the Stirling engine 36, a fourth pipe 32d that connects the Stirling engine 36 and the accommodation container 31, a pump 32e that causes the heat medium to flow from the accommodation container 31 to the first pipe 32a, and a heat medium flow rate control unit 32f that adjusts a flow rate of the heat medium flowing out from the accommodation container 31 to the first pipe 32a. In this example, the pump 32e and the heat medium flow rate control unit 32f are provided in the first pipe 32a. Examples of the pump 32e include a metal bellows pump. The heat medium flow rate control unit 32f includes a variable leak valve or the like as an adjustment valve.

The heat medium flowing out from the accommodation container 31 sequentially flows through the first pipe 32a, the second pipe 32b, the third pipe 32c, and the fourth pipe 32d, and is returned to the accommodation container 31. That is, the heat medium circulation unit 32 functions as a heat medium circulation line through which the heat medium is circulated between the inside and the outside of the accommodation container 31. The heat medium heated by the heat generating device 11 inside the accommodation container 31 flows through the heat medium circulation unit 32 serving as a heat medium circulation line, and is cooled sequentially via the gas turbine 33, the steam generator 34, the Stirling engine 36, and the thermoelectric converter 37. The cooled heat medium flows into the accommodation container 31 and is heated again by the heat generating device 11.

The gas turbine 33 is driven by the heat medium flowing out from the accommodation container 31. A temperature of the heat medium supplied to the gas turbine 33 is preferably in a range of, for example, 600° C. or higher and 1500° C. or lower. The gas turbine 33 includes a compressor 33a and a turbine 33b. The compressor 33a and the turbine 33b are coupled to each other by a rotation shaft (not shown). The compressor 33a generates a high-temperature and high-pressure heat medium by compressing the helium gas heated by the heat generating structure 20. The turbine 33b is rotated about the rotation shaft by the heat medium that has passed through the compressor 33a.

The gas turbine 33 is connected to a power generator 38. The power generator 38 is coupled to the rotation shaft of the gas turbine 33, and generates power by rotation of the turbine 33b.

The steam generator 34 generates steam by the heat of the heat medium flowing out from the gas turbine 33. The steam generator 34 includes an internal pipe 34a and a heat exchange unit 34b. The internal pipe 34a connects the second pipe 32b and the third pipe 32c and circulates the heat medium. The heat exchange unit 34b is implemented by a pipe through which boiler water is circulated, and performs heat exchange between the boiler water circulating through the pipe and the heat medium flowing through the internal pipe 34a. By the heat exchange, the steam generator 34 generates steam from the boiler water.

The steam generator 34 is connected to the steam turbine 35 via a steam pipe 34c and a water supply pipe 34d. The steam pipe 34c supplies the steam generated by the heat exchange unit 34b to the steam turbine 35. The water supply pipe 34d includes a condenser (not shown) and a water supply pump (not shown). The steam discharged from the steam turbine 35 is cooled by the condenser and returned to the boiler water, and the boiler water is sent to the heat exchange unit 34b via the water supply pump.

The steam turbine 35 is driven by the steam generated by the steam generator 34. A temperature of the steam supplied to the steam turbine 35 is preferably in a range of, for example, 300° C. or higher and 700° C. or lower. The steam turbine 35 has a rotation shaft (not shown) and is rotated about the rotation shaft.

The steam turbine 35 is connected to a power generator 39. The power generator 39 is coupled to the rotation shaft of the steam turbine 35, and generates power by rotation of the steam turbine 35.

The Stirling engine 36 is driven by the heat medium flowing out from the steam generator 34. The temperature of the heat medium supplied to the Stirling engine 36 is preferably in a range of, for example, 300° C. or higher and 1000° C. or lower. In this example, the Stirling engine 36 is a displacer type Stirling engine. The Stirling engine 36 includes a cylinder portion 36a, a displacer piston 36b, a power piston 36c, a flow path 36d, and a crank portion 36e.

The cylinder portion 36a is formed into a cylindrical shape, and one end thereof is closed and the other end thereof is open. The displacer piston 36b is provided inside the cylinder portion 36a. The power piston 36c is provided inside the cylinder portion 36a at the other end side of the displacer piston 36b. The displacer piston 36b and the power piston 36c can reciprocate in an axial direction of the cylinder portion 36a.

An expansion space 42 and a compression space 43 partitioned by the displacer piston 36b are provided inside the cylinder portion 36a. The expansion space 42 is provided at one end side of the cylinder portion 36a with respect to the compression space 43. A working fluid is sealed in the expansion space 42 and the compression space 43. Examples of the working fluid include a helium gas, a hydrogen-based gas, and air. In this example, a helium gas is used as the working fluid.

The flow path 36d is provided outside the cylinder portion 36a, and connects the expansion space 42 and the compression space 43. The flow path 36d circulates the working fluid between the expansion space 42 and the compression space 43.

The flow path 36d includes a high temperature portion 45, a low temperature portion 46, and a regenerator 47. The working fluid in the expansion space 42 sequentially passes through the high temperature portion 45, the regenerator 47, and the low temperature portion 46, and flows into the compression space 43. The working fluid in the compression space 43 sequentially passes through the low temperature portion 46, the regenerator 47, and the high temperature portion 45, and flows into the expansion space 42.

The high temperature portion 45 is a heat exchanger for heating the working fluid. A heat transfer pipe 48 is provided outside the high temperature portion 45. The heat transfer pipe 48 connects the third pipe 32c and the fourth pipe 32d, and circulates the heat medium from the third pipe 32c to the fourth pipe 32d. When the heat medium flows from the third pipe 32c to the heat transfer pipe 48, the heat of the heat medium is transferred to the high temperature portion 45, and the working fluid passing through the high temperature portion 45 is heated.

The low temperature portion 46 is a heat exchanger for cooling the working fluid. A cooling pipe 49 is provided outside the low temperature portion 46. The cooling pipe 49 is connected to a cooling medium supply unit (not shown). The cooling pipe 49 circulates a cooling medium supplied from the cooling medium supply unit. When the cooling medium flows through the cooling pipe 49, the heat of the working fluid passing through the low temperature portion 46 is taken by the cooling medium, and the working fluid is cooled. The cooling medium is, for example, water.

The regenerator 47 is a heat exchanger for storing heat. The regenerator 47 is provided between the high temperature portion 45 and the low temperature portion 46. When the working fluid moves from the expansion space 42 to the compression space 43, the regenerator 47 receives and accumulates the heat from the working fluid that has passed through the high temperature portion 45. When the working fluid moves from the compression space 43 to the expansion space 42, the regenerator 47 supplies the accumulated heat to the working fluid that has passed through the low temperature portion 46.

The crank portion 36e is provided at the other end of the cylinder portion 36a. The crank portion 36e includes, for example, a crankshaft rotatably supported by a crankcase, a rod connected to the displacer piston 36b, a rod connected to the power piston 36c, and a coupling member that couples the rod and the crankshaft. The crank portion 36e converts reciprocating motions of the displacer piston 36b and the power piston 36c into a rotational motion of the crankshaft.

The Stirling engine 36 is connected to a power generator 40. The power generator 40 is coupled to the crankshaft of the Stirling engine 36, and generates power by rotation of the crankshaft.

The thermoelectric converter 37 converts the heat of the heat medium circulating through the fourth pipe 32d into electric power by utilizing a Seebeck effect. The thermoelectric converter 37 generates electric power by the heat medium of, for example, 300° C. or lower. The thermoelectric converter 37 is formed into a tubular shape and covers an outer periphery of the fourth pipe 32d.

The thermoelectric converter 37 includes a thermoelectric conversion module 37a provided on an inner surface thereof and a cooling unit 37b provided on an outer surface thereof. The thermoelectric conversion module 37a includes a heat reception substrate facing the fourth pipe 32d, a heat reception side electrode provided on the heat reception substrate, a heat dissipation substrate facing the cooling unit 37b, a heat dissipation side electrode provided on the heat dissipation substrate, p-type thermoelectric elements each made of a p-type semiconductor, and n-type thermoelectric elements each made of an n-type semiconductor. In this example, in the thermoelectric conversion module 37a, the p-type thermoelectric elements and the n-type thermoelectric elements are alternately arranged, and a p-type thermoelectric element and an n-type thermoelectric element adjacent to each other are electrically connected to each other via the heat reception side electrode and the heat dissipation side electrode. A lead is electrically connected to a p-type thermoelectric element provided at one end of the thermoelectric conversion module 37a and an n-type thermoelectric element provided at the other end of the thermoelectric conversion module 37a via the heat dissipation side electrode. The cooling unit 37b is implemented by, for example, a pipe through which cooling water is circulated. Accordingly, the thermoelectric converter 37 generates electric power corresponding to a temperature difference generated between the inner surface and the outer surface.

The structure of the heat generating module 18 will be described in detail with reference to FIGS. 2 and 3. In addition to the heat generating structure 20 and the heater 21, the heat generating module 18 includes a core tube 50, a shaft portion 51, and a support portion 52. The core tube 50 is formed in a tubular shape. In this example, the core tube 50 has a cylindrical shape. The core tube 50 is made of, for example, mullite and alumina. The core tube 50 is provided in a space formed by the inner surface of the heater 21. The heat generating structure 20 is provided inside the core tube 50.

The shaft portion 51 is formed in a tubular shape. In this example, the shaft portion 51 has a cylindrical shape. For example, one end of the shaft portion 51 is fixed to the upper lid of the sealed container 15, and the other end of the shaft portion 51 is fixed to the lower lid of the sealed container 15. The temperature sensor 22 is provided inside the shaft portion 51 (see FIGS. 1 and 3).

The support portion 52 is formed in a tubular shape. In this example, the support portion 52 has a cylindrical shape. The shaft portion 51 is inserted into the support portion 52. In the present embodiment, four support portions 52 are arranged at equal intervals along the longitudinal direction (axial direction) of the shaft portion 51. Each support portion 52 is fixed to the shaft portion 51 using a screw 53. The support portion 52 supports the heat generating structure 20. The heat generating structure 20 is fixed to the shaft portion 51 via the support portion 52.

The heat generating structure 20 includes a heat generating element 55 that generates heat by occluding and discharging hydrogen contained in the hydrogen-based gas, a holder 56 that holds the heat generating element 55, and a frame 57 that forms an outer frame. The heat generating structure 20 includes at least one heat generating element 55, and the number of heat generating elements 55 can be appropriately changed.

The heat generating element 55 is formed in a plate shape. In this example, the heat generating element 55 has a quadrangular shape. The heat generating element 55 is arranged upright along a direction in which the hydrogen-based gas flows inside the sealed container 15. Accordingly, for example, when the hydrogen occluded in the heat generating structure 20 is discharged, the hydrogen-based gas inside the sealed container 15 smoothly flows from the supply port 15b to the exhaust port 15a without being blocked by the heat generating element 55.

In the present embodiment, a plurality of heat generating elements 55 are radially arranged around the shaft portion 51. In this example, 16 heat generating elements 55 are used. The plurality of heat generating elements 55 are heated by the heat of the heater 21 and the heat of the adjacent heat generating elements 55. As a result, it is possible to reduce an input power supply of the heater 21 necessary to maintain a predetermined temperature. A detailed structure of the heat generating element 55 will be described later with reference to other drawings.

The holder 56 is formed in a rod shape having a longitudinal direction. In this example, the holder 56 has a square rod shape. The holder 56 is arranged such that the longitudinal direction thereof is orthogonal to the direction in which the hydrogen-based gas flows inside the sealed container 15. In the present embodiment, a plurality of holders 56 are arranged radially around the shaft portion 51. One end of the holder 56 in the longitudinal direction is arranged at a position farther from the shaft portion 51 than the other end.

A groove 60 extending in the longitudinal direction of the holder 56 is formed in a surface of the holder 56. An edge portion of the heat generating element 55 is inserted into the groove 60. In this example, the groove 60 is formed in an intermediate portion from the other end to one end of the holder 56. That is, the groove 60 does not penetrate in the longitudinal direction of the holder 56, and one end side of the holder 56 is a dead end. Therefore, the heat generating element 55 inserted into the groove 60 is restricted from moving to one end side of the holder 56, and is prevented from falling off from the holder 56.

In the present embodiment, one heat generating element 55 is held by a pair of holders 56 arranged on an upstream side and a downstream side of the hydrogen-based gas flowing inside the sealed container 15. In this example, 16 pairs of holders 56 are used to hold the 16 heat generating elements 55. The pair of holders 56 is arranged such that surfaces on which the grooves 60 are formed face each other.

The frame 57 is coupled to the holder 56. In the present embodiment, a pair of frames 57 arranged on the upstream side and the downstream side of the hydrogen-based gas flowing inside the sealed container 15 is coupled to a pair of holders 56. The frame 57 includes an inner frame 57a and an outer frame 57b. The inner frame 57a and the outer frame 57b are coupled to the holder 56 using screws 61.

The inner frame 57a is formed in a plate shape. In this example, the inner frame 57a has a disc shape. An opening 62 into which the shaft portion 51 is inserted is formed at the center of the inner frame 57a. The opening 62 has, for example, a circular shape. A diameter of the opening 62 of the inner frame 57a is equal to or smaller than an outer diameter of the support portion 52. Therefore, in a state where the shaft portion 51 is inserted into the opening 62, the inner frame 57a comes into contact with an end portion of the support portion 52, and a movement of the inner frame 57a in the longitudinal direction is restricted.

The outer frame 57b is formed in a frame shape. In this example, the outer frame 57b has a ring shape. The outer frame 57b is arranged at a position farther from the shaft portion 51 than the inner frame 57a, and a gap is formed between the outer frame 57b and the inner frame 57a. The hydrogen-based gas flows through the gap formed between the outer frame 57b and the inner frame 57a. Accordingly, the hydrogen-based gas inside the sealed container 15 smoothly flows from the supply port 15b to the exhaust port 15a. Openings may be formed in the inner frame 57a and the outer frame 57b to allow the hydrogen-based gas to flow more smoothly.

Figure 4:
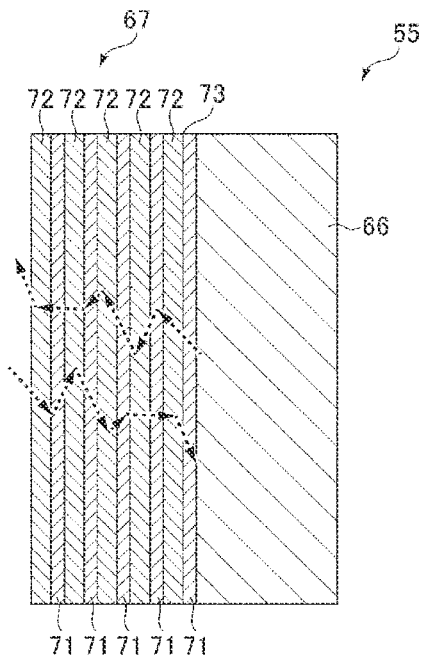
FIG. 4 is a cross-sectional view showing a structure of a heat generating element having a first layer and a second layer.

A detailed structure of the heat generating element 55 will be described with reference to FIG. 4. As shown in FIG. 4, the heat generating element 55 includes a base 66 and a multilayer film 67.

The base 66 is made of a hydrogen storage metal, a hydrogen storage alloy, or a proton conductor. Examples of the hydrogen storage metal include Ni, Pd, V, Nb, Ta, and Ti. Examples of the hydrogen storage alloy include $LaNi_5$, $CaCu_5$, $MgZn_2$, $ZrNi_2$, $ZrCr_2$, TiFe, TiCo, $Mg_2Ni$, and $Mg_2Cu$. Examples of the proton conductor include a $BaCeO_3$-based conductor (for example, $Ba(Ce_{0.95}Y_{0.05})O_{3-6}$), a $SrCeO_3$-based conductor (for example, $Sr(Ce_{0.95}Y_{0.05})O_{3-6}$), a $CaZrO_3$-based conductor (for example, $CaZr_{0.95}Y_{0.05}O_{3-\alpha}$), a $SrZrO_3$-based conductor (for example, $SrZr_{0.9}Y_{0.1}O_{3-\alpha}$), $\beta\ Al_2O_3$, and $\beta\ Ga_2O_3$.

The multilayer film 67 is provided on the base 66. Although the multilayer film 67 is provided only on a surface of the base 66 in FIG. 4, the multilayer film 67 may be provided on both surfaces of the base 66. In the present embodiment, the heat generating structure 20 includes the heat generating element 55 in which the multilayer film 67 is provided on both surfaces of the base 66. When the heat generating structure 20 is formed by the heat generating element 55 in which the multilayer film 67 is provided only on the surface of the base 66, it is preferable that the two heat generating elements 55 are arranged so that the base 66 faces each other and held by the pair of holders 56. Accordingly, the multilayer films 67 of the heat generating elements 55 are arranged on both surfaces of the heat generating structure 20.

The multilayer film 67 has a first layer 71 made of a hydrogen storage metal or a hydrogen storage alloy, and a second layer 72 made of a hydrogen storage metal or a hydrogen storage alloy, which is different from that of the first layer 71, or ceramics. A heterogeneous material interface 73 to be described later is formed between the base 66 and the first layer 71 and the second layer 72. In FIG. 4, the multilayer film 67 is formed by alternately stacking the first layer 71 and the second layer 72 in order on the surface of the base 66. The first layer 71 and the second layer 72 each have five layers. The number of layers of each of the first layer 71 and the second layer 72 may be changed as appropriate. The multilayer film 67 may be formed by alternately stacking the second layer 72 and the first layer 71 in order on the surface of the base 66. The multilayer film 67 preferably has one or more first layers 71 and one or more second layers 72, and one or more heterogeneous material interfaces 73 are preferably formed.

The first layer 71 is made of, for example, any one of Ni, Pd, Cu, Mn, Cr, Fe, Mg, Co, and an alloy thereof. An alloy for forming the first layer 71 is preferably an alloy made of two or more of Ni, Pd, Cu, Mn, Cr, Fe, Mg, and Co. The alloy for forming the first layer 71 may be an alloy obtained by adding an additive element to Ni, Pd, Cu, Mn, Cr, Fe, Mg, and Co.

The second layer 72 is made of, for example, any one of Ni, Pd, Cu, Mn, Cr, Fe, Mg, Co, an alloy thereof, and SiC. An alloy for forming the second layer 72 is preferably an alloy made of two or more of Ni, Pd, Cu, Mn, Cr, Fe, Mg, and Co. The alloy for forming the second layer 72 may be an alloy obtained by adding an additive element to Ni, Pd, Cu, Mn, Cr, Fe, Mg, and Co.

A combination of the first layer 71 and the second layer 72 is preferably Pd—Ni, Ni—Cu, Ni—Cr, Ni—Fe, Ni—Mg, and Ni—Co when types of elements are expressed as "first layer 71-second layer 72 (second layer 72-first layer 71)". When the second layer 72 is made of ceramics, the "first layer 71-second layer 72" is preferably Ni—SiC.

Figure 5:
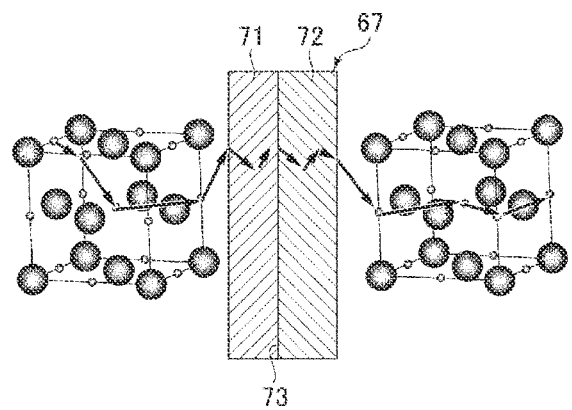
FIG. 5 is an explanatory diagram showing generation of excess heat.

As shown in FIG. 5, hydrogen atoms permeate through the heterogeneous material interface 73. FIG. 5 is a schematic diagram showing a state where the hydrogen atoms in a metal lattice of the first layer 71 permeate through the heterogeneous material interface 73 and move to a metal lattice of the second layer 72 when the first layer 71 and the second layer 72 each made of a hydrogen storage metal having a face-centered cubic structure are made to occlude hydrogen and then the first layer 71 and the second layer 72 are heated.

The heat generating element 55 occludes hydrogen by the base 66 and the multilayer film 67 when the hydrogen-based gas is supplied to the sealed container 15. Even when the supply of the hydrogen-based gas to the sealed container 15 is stopped, the heat generating element 55 maintains a state where hydrogen is occluded in the base 66 and the multilayer film 67. In the heat generating element 55, when heating is started by the heater 21, hydrogen occluded in the base 66 and the multilayer film 67 is discharged, and quantum diffusion occurs while hopping the inside of the multilayer film 67. It is known that hydrogen is light and hops in a manner of quantum diffusion at a site (octahedral site or tetrahedral site) occupied by hydrogen of a certain substance A and substance B. When the heat generating element 55 is heated by the heater 21 in a vacuum state, hydrogen permeates through the heterogeneous material interface 73 in a manner of quantum diffusion, and generates excess heat equal to or higher than the heating temperature of the heater 21.

A thickness of each of the first layer 71 and the second layer 72 is preferably less than 1000 nm. When the thickness of each of the first layer 71 and the second layer 72 is 1000 nm or more, hydrogen is less likely to permeate through the multilayer film 67. When the thickness of each of the first layer 71 and the second layer 72 is less than 1000 nm, a nano-structure that does not exhibit a bulk property can be maintained. The thickness of each of the first layer 71 and the second layer 72 is more preferably less than 500 nm. When the thickness of each of the first layer 71 and the second layer 72 is less than 500 nm, a nano-structure that does not exhibit a bulk property at all can be maintained.

An example of a method for producing the heat generating element 55 will be described. The plate-shaped base 66 is prepared, an evaporation device is used to make a hydrogen storage metal or a hydrogen storage alloy for forming the first layer 71 or the second layer 72 into a gas phase state, and then the first layer 71 and the second layer 72 are alternately formed on the base 66 by aggregation or adsorption, so that the heat generating element 55 is formed. The first layer 71 and the second layer 72 are preferably formed continuously in a vacuum state. Accordingly, between the first layer 71 and the second layer 72, no natural oxide film is formed and only the heterogeneous material interface 73 is formed. The evaporation device may be a physical evaporation device in which the hydrogen storage metal or the hydrogen storage alloy is evaporated by a physical method. The physical evaporation device is preferably a sputtering device, a vacuum evaporation device, and a chemical vapor deposition (CVD) device. Alternatively, the hydrogen storage metal or the hydrogen storage alloy may be deposited on the base 66 by an electroplating method, to alternately form the first layer 71 and the second layer 72.

Since the heat generating element 55 generates heat using hydrogen, it does not generate greenhouse gases such as carbon dioxide. Hydrogen used is generated from water and is thus inexpensive. Unlike a nuclear fission reaction, heat generation of the heat generating element 55 is safe since there is no chain reaction. Therefore, since the heat utilization system 10 and the heat generating device 11 utilize the heat generating element 55 as a heat energy source, inexpensive, clean, and safe energy can be supplied.

The invention is not limited to the first embodiment described above, and can be modified as appropriate without departing from the scope of the invention.

In the first embodiment, although the multilayer film 67 of the heat generating element 55 includes the first layer 71 and the second layer 72, the structure of the multilayer film 67 is not limited thereto.

Figure 6:
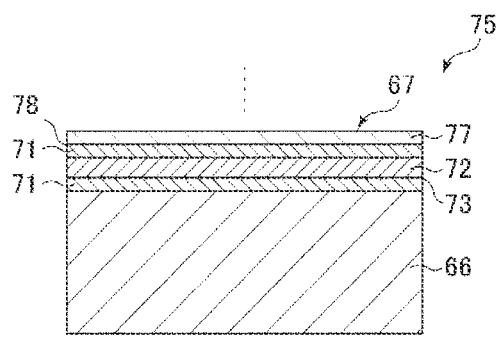
FIG. 6 is a cross-sectional view of a heat generating element having a first layer, a second layer, and a third layer.

For example, as shown in FIG. 6, in a heat generating element 75, the multilayer film 67 provided on the base 66 further has a third layer 77 in addition to the first layer 71 and the second layer 72. The third layer 77 is made of a hydrogen storage metal, a hydrogen storage alloy, or ceramics different from those of the first layer 71 and the second layer 72. A thickness of the third layer 77 is preferably less than 1000 nm. In FIG. 6, the first layer 71, the second layer 72, and the third layer 77 are stacked on the surface of the base 66 in order of the first layer 71, the second layer 72, the first layer 71, and the third layer 77. The first layer 71, the second layer 72, and the third layer 77 may be stacked on the surface of the base 66 in order of the first layer 71, the third layer 77, the first layer 71, and the second layer 72. That is, the multilayer film 67 has a stacking structure in which the first layer 71 is provided between the second layer 72 and the third layer 77. The multilayer film 67 preferably has one or more third layers 77. Similar to the heterogeneous material interface 73, hydrogen atoms permeate through a heterogeneous material interface 78 formed between the first layer 71 and the third layer 77. The heat generating element 75 can be used instead of the heat generating element 55. That is, the heat generating structure 20 may include the heat generating element 75.

The third layer 77 is made of, for example, any one of Ni, Pd, Cu, Cr, Fe, Mg, Co, an alloy thereof, SiC, CaO, $Y_2O_3$, TiC, $LaB_6$, SrO, and BaO. An alloy for forming the third layer 77 is preferably an alloy made of two or more of Ni, Pd, Cu, Cr, Fe, Mg, and Co. The alloy for forming the third layer 77 may be an alloy obtained by adding an additive element to Ni, Pd, Cu, Cr, Fe, Mg, and Co.

In particular, the third layer 77 is preferably made of any one of CaO, $Y_2O_3$, TiC, $LaB_6$, SrO, and BaO. In the heat generating element 75 having the third layer 77 made of any one of CaO, $Y_2O_3$, TiC, $LaB_6$, SrO, and BaO, an occluding amount of hydrogen is increased, an amount of hydrogen permeating through the heterogeneous material interfaces 73 and 78 is increased, and a high output of excess heat can be achieved. The thickness of the third layer 77 made of any one of CaO, $Y_2O_3$, TiC, $LaB_6$, SrO, and BaO is preferably 10 nm or less. Accordingly, hydrogen atoms easily permeate through the multilayer film 67. The third layer 77 made of any one of CaO, $Y_2O_3$, TiC, $LaB_6$, SrO, and BaO may not be formed into a complete film shape and may be formed into an island shape. The first layer 71 and the third layer 77 are preferably formed continuously in a vacuum state. Accordingly, between the first layer 71 and the third layer 77, no natural oxide film is formed and only the heterogeneous material interface 78 is formed.

A combination of the first layer 71, the second layer 72, and the third layer 77 is preferably Pd—CaO—Ni, Pd—$Y_2O_3$—Ni, Pd—TiC—Ni, Pd—$LaB_6$—Ni, Ni—CaO—Cu, Ni—$Y_2O_3$—Cu, Ni—TiC—Cu, Ni—$LaB_6$—Cu, Ni—Co—Cu, Ni—CaO—Cr, Ni—$Y_2O_3$—Cr, Ni—TiC—Cr, Ni—$LaB_6$—Cr, Ni—CaO—Fe, Ni—$Y_2O_3$—Fe, Ni—TiC—Fe, Ni—$LaB_6$—Fe, Ni—Cr—Fe, Ni—CaO—Mg, Ni—$Y_2O_3$—Mg, Ni—TiC—Mg, Ni—$LaB_6$—Mg, Ni—CaO—Co, Ni—$Y_2O_3$—Co, Ni—TiC—Co, Ni—$LaB_6$—Co, Ni—CaO—SiC, Ni—Y$_2$O$_3$—SiC, Ni—TiC—SiC, and Ni—LaB$_6$—SiC when types of elements are expressed as "first layer 71-third layer 77-second layer 72".

Figure 7:
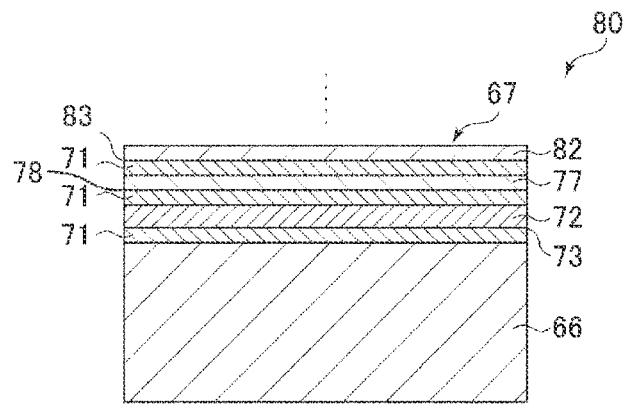
FIG. 7 is a cross-sectional view of a heat generating element having a first layer, a second layer, a third layer, and a fourth layer.

The heat generating structure 20 may include a heat generating element 80 shown in FIG. 7 instead of the heat generating element 55 or the heat generating element 75. As shown in FIG. 7, in the heat generating element 80, the multilayer film 67 provided on the base 66 further has a fourth layer 82 in addition to the first layer 71, the second layer 72, and the third layer 77. The fourth layer 82 is made of a hydrogen storage metal, a hydrogen storage alloy, or ceramics different from those of the first layer 71, the second layer 72, and the third layer 77. A thickness of the fourth layer 82 is preferably less than 1000 nm. In FIG. 7, the first layer 71, the second layer 72, the third layer 77, and the fourth layer 82 are stacked on the surface of the base 66 in order of the first layer 71, the second layer 72, the first layer 71, the third layer 77, the first layer 71, and the fourth layer 82. The first layer 71, the second layer 72, the third layer 77, and the fourth layer 82 may be stacked on the surface of the base 66 in order of the first layer 71, the fourth layer 82, the first layer 71, the third layer 77, the first layer 71, and the second layer 72. That is, the multilayer film 67 has a stacking structure in which the second layer 72, the third layer 77, and the fourth layer 82 are stacked in any order and the first layer 71 is provided between the second layer 72 and the third layer 77, between the third layer 77 and the fourth layer 82, and between the second layer 72 and the fourth layer 82. The multilayer film 67 preferably has one or more fourth layers 82. Similar to the heterogeneous material interface 73 and the heterogeneous material interface 78, hydrogen atoms permeate through a heterogeneous material interface 83 formed between the first layer 71 and the fourth layer 82. The heat generating element 80 can be used instead of the heat generating element 55. That is, the heat generating structure 20 may include the heat generating element 80.

The fourth layer 82 is made of, for example, any one of Ni, Pd, Cu, Cr, Fe, Mg, Co, an alloy thereof, SiC, CaO, Y$_2$O$_3$, TiC, LaB$_6$, SrO, and BaO. An alloy for forming the fourth layer 82 is preferably an alloy made of two or more of Ni, Pd, Cu, Cr, Fe, Mg, and Co. The alloy for forming the fourth layer 82 may be an alloy obtained by adding an additive element to Ni, Pd, Cu, Cr, Fe, Mg, and Co.

In particular, the fourth layer 82 is preferably made of any one of CaO, Y$_2$O$_3$, TiC, LaB$_6$, SrO, and BaO. In the heat generating element 80 having the fourth layer 82 made of any one of CaO, Y$_2$O$_3$, TiC, LaB$_6$, SrO, and BaO, an occluding amount of hydrogen is increased, an amount of hydrogen permeating through the heterogeneous material interfaces 73, 78, and 83 is increased, and a high output of excess heat can be achieved. The thickness of the fourth layer 82 made of any one of CaO, Y$_2$O$_3$, TiC, LaB$_6$, SrO, and BaO is preferably 10 nm or less. Accordingly, hydrogen atoms easily permeate through the multilayer film 67. The fourth layer 82 made of any one of CaO, Y$_2$O$_3$, TiC, LaB$_6$, SrO, and BaO may not be formed into a complete film shape and may be formed into an island shape. The first layer 71 and the fourth layer 82 are preferably formed continuously in a vacuum state. Accordingly, between the first layer 71 and the fourth layer 82, no natural oxide film is formed and only the heterogeneous material interface 83 is formed.

A combination of the first layer 71, the second layer 72, the third layer 77, and the fourth layer 82 is preferably Ni—CaO—Cr—Fe, Ni—Y$_2$O$_3$—Cr—Fe, Ni—TiC—Cr—Fe, and Ni—LaB$_6$—Cr—Fe when types of elements are expressed as "first layer 71-fourth layer 82-third layer 77-second layer 72".

A configuration of the multilayer film 67 such as a ratio of layer thicknesses, the number of layers of each layer, and a material may be appropriately changed according to a temperature to be used. Hereinafter, an example of the configuration of the multilayer film 67 corresponding to a temperature will be described after describing a "relationship between a ratio of layer thicknesses of the multilayer film and the excess heat", a "relationship between the number of layers of the multilayer film and the excess heat", and a "relationship between a material of the multilayer film and the excess heat".

First, the "relationship between a ratio of layer thicknesses of the multilayer film and the excess heat" will be described. A relationship between a ratio of the thickness of the second layer 72 to the thickness of the first layer 71 and the excess heat was examined using the heat generating element 55 including the base 66 made of Ni and the multilayer film 67 having the first layer 71 made of Cu and the second layer 72 made of Ni. Hereinafter, the ratio of layer thicknesses of the multilayer film 67 is referred to as Ni:Cu.

Eight types of heat generating elements 55, in which the multilayer films 67 were formed under the same conditions except for the ratio Ni:Cu, were prepared and used as Examples 1 to 8. The multilayer film 67 was provided only on the surface of the base 66. Ratios Ni:Cu in the heat generating elements 55 according to Examples 1 to 8 are respectively 7:1, 14:1, 4.33:1, 3:1, 5:1, 8:1, 6:1, and 6.5:1. In each of the heat generating elements 55 according to Examples 1 to 8, the multilayer film 67 is formed by repeating a stacking configuration having the first layer 71 and the second layer 72. In each of the heat generating elements 55 according to Examples 1 to 8, the number of layers in the stacking configuration of the multilayer film 67 (hereinafter, referred to as the number of layers of the multilayer film) was 5. The thickness of the entire multilayer film 67 in each of the heat generating elements 55 according to Examples 1 to 8 was substantially the same. An experimental heat generating device (not shown) for examining the relationship between the ratio of the thickness of each layer of the multilayer film 67 and the excess heat was prepared, and each of the heat generating elements 55 according to Examples 1 to 8 was introduced into the experimental heat generating device.

The experimental heat generating device will be described. The experimental heat generating device includes a sealed container, two heat generating elements provided inside the sealed container, and a heater that heats the heat generating elements. The heat generating element is formed into a plate shape. The heater is a ceramic heater formed into a plate shape, and includes a built-in thermocouple. The heater is provided between the two heat generating elements. The two heat generating elements 55 has the same configuration, that is, Ni:Cu is the same. The sealed container is connected to a hydrogen-based gas supply path and an exhaust path. The hydrogen-based gas supply path connects a gas cylinder that stores a hydrogen-based gas and the sealed container. The hydrogen-based gas supply path is provided with an adjustment valve or the like for adjusting a supply amount of the hydrogen-based gas stored in the gas cylinder to the sealed container. The exhaust path connects a dry pump for vacuum evacuating an inside of the sealed container and the sealed container. The exhaust path is provided with an adjustment valve for adjusting an exhaust amount of the gas. In the experimental heat generating device, a protium gas (manufactured by Numata Oxygen Co., grade 2, purity: 99.999 vol % or more) was used as a hydrogen-based gas.

Figure 8:
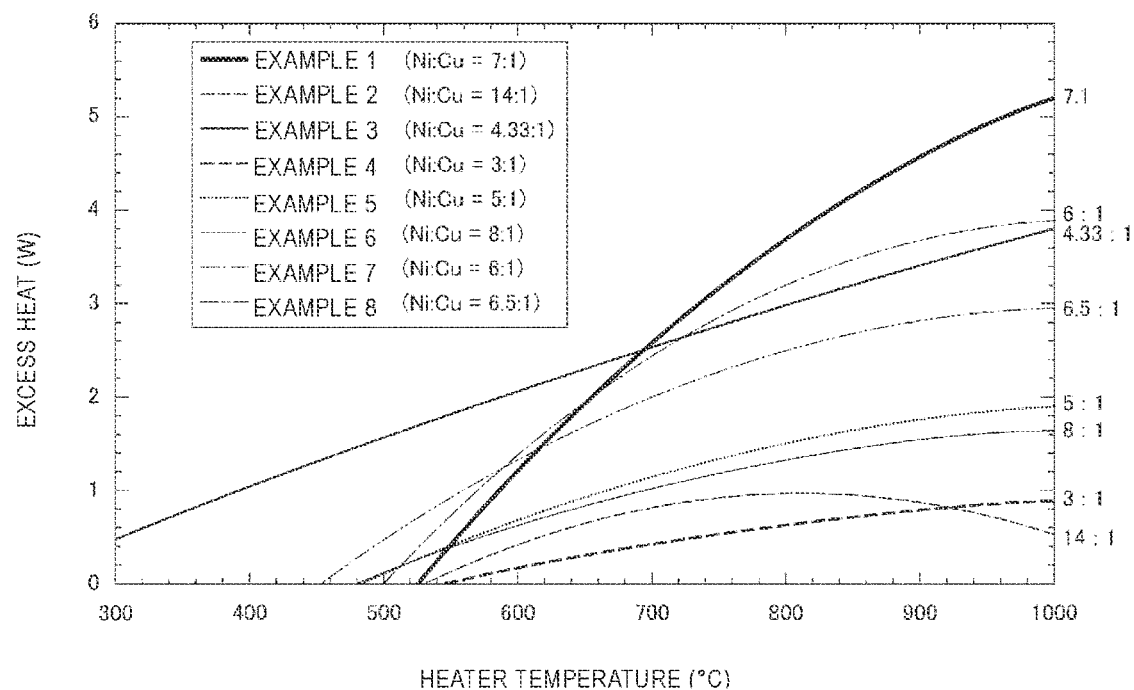
FIG. 8 is a graph showing a relationship between a ratio of layer thicknesses of a multilayer film and the excess heat.

Each of the heat generating elements 55 according to Examples 1 to 8 was provided inside the sealed container of the experimental heat generating device, and the hydrogen occluding step and the hydrogen discharging step were repeated. That is, in the experimental heat generating device, a hydrogen occluding step of occluding hydrogen contained in the hydrogen-based gas in the heat generating element 55 by supplying the hydrogen-based gas to the inside of the sealed container, and a hydrogen discharging step of discharging hydrogen stored in the heat generating element 55 by performing the vacuum evacuation of the inside of the sealed container and heating of the heat generating element 55 were repeatedly performed. In the hydrogen occluding step, the hydrogen-based gas was supplied into the sealed container at about 50 Pa. The time for occluding hydrogen in the heat generating element 55 was about 64 hours. Before the hydrogen occluding step, first, the inside of the sealed container was baked by a heater at about 200° C. or higher for 36 hours to remove water and the like adhered to a front surface of the heat generating element 55. Hydrogen discharging steps were performed with input electric power of the heater of 9 W, 18 W, and 27 W, and hydrogen occluding steps were performed between the hydrogen discharging steps. Then, the temperature of the heat generating element 55 in each of the hydrogen discharging steps was measured using the thermocouple built in the heater. Results are shown in FIG. 8. FIG. 8 is a graph obtained by fitting measured data by a predetermined method. In FIG. 8, a horizontal axis indicates a heater temperature and a vertical axis indicates electric power of excess heat. The heater temperature is the temperature of the heat generating element 55 at predetermined input electric power. In FIG. 8, Example 1 was expressed as "Ni:Cu=7:1", Example 2 was expressed as "Ni:Cu=14:1", Example 3 was expressed as "Ni:Cu=4.33:1", Example 4 was expressed as "Ni:Cu=3:1", Example 5 was expressed as "Ni:Cu=5:1", Example 6 was expressed as "Ni:Cu=8:1", Example 7 was expressed as "Ni:Cu=6:1", and Example 8 was expressed as "Ni:Cu=6.5:1".

From FIG. 8, it was confirmed that the excess heat was generated in all of the heat generating elements 55 according to Examples 1 to 8. When comparing the heat generating elements 55 according to Examples 1 to 8 at a heater temperature of 700° C. or higher, it is found that the heat generating element 55 according to Example 1 generates the largest excess heat. When comparing the heat generating element according to Example 3 with the heat generating elements 55 according to Examples 1, 2, 4 to 8, it is found that the heat generating element according to Example 3 generates excess heat in a wide range in which the heater temperature is 300° C. or higher and 1000° C. or lower. It is found that the excess heat increases as the heater temperature increases in the heat generating elements 55 according to Examples 1, 3 to 8 in which Ni:Cu of the multilayer film 67 is 3:1 to 8:1. It is found that the excess heat decreases at a heater temperature of 800° C. or higher in the heat generating element 55 according to Example 2 in which Ni:Cu of the multilayer film 67 is 14:1. Thus, it is considered that the excess heat does not simply increase with respect to the ratio Ni:Cu due to a quantum effect of hydrogen in the multilayer film 67.

Next, the "relationship between the number of layers of the multilayer film and the excess heat" will be described. A relationship between the number of layers of the multilayer film 67 and the excess heat was examined by using the heat generating element 55 including the base 66 made of Ni and the multilayer film 67 having the first layer 71 made of Cu and the second layer 72 made of Ni.

Eight types of heat generating elements 55, in which the multilayer films 67 were produced under the conditions same as the conditions for producing the heat generating element 55 according to Example 1 except for the number of layers, were prepared and used as Examples 9 to 16. The number of layers of the multilayer films 67 of the heat generating elements 55 according to Examples 1, 9 to 16 is respectively 5, 3, 7, 6, 8, 9, 12, 4, and 2.

Figure 9:
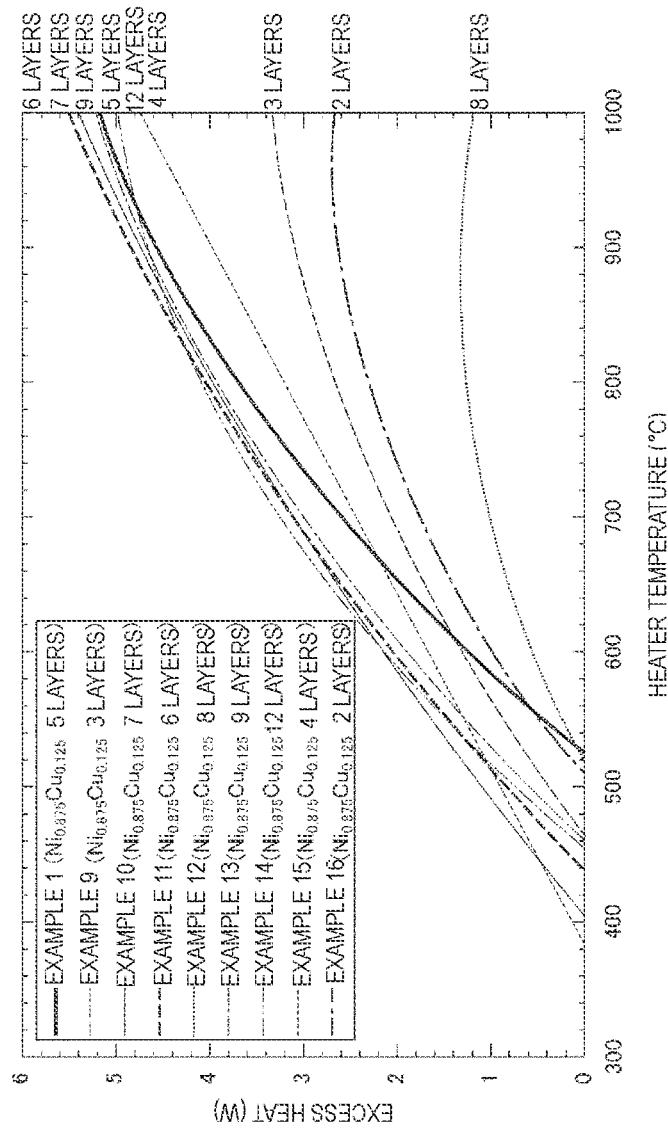
FIG. 9 is a graph showing a relationship between the number of layers of the multilayer film and the excess heat.

Each of the heat generating elements 55 according to Examples 1, 9 to 16 was provided inside a sealed container of an experimental heat generating device. The experimental heat generating device is the same as the device used to examine the above-described "relationship between a ratio of layer thicknesses of the multilayer film and the excess heat". In the experimental heat generating device, the temperature of each of the heat generating elements 55 during the hydrogen discharging step was measured by the same method as that for the above-described "relationship between a ratio of layer thicknesses of the multilayer film and the excess heat". Results are shown in FIG. 9. FIG. 9 is a graph obtained by fitting measured data by a predetermined method. In FIG. 9, a horizontal axis indicates a heater temperature and a vertical axis indicates electric power of excess heat. In FIG. 9, based on the thickness of each layer, Example 1 was expressed as "$Ni_{0.875}Cu_{0.125}$ 5 layers", Example 9 was expressed as "$Ni_{0.875}Cu_{0.125}$ 3 layers", Example 10 was expressed as "$Ni_{0.875}Cu_{0.125}$ 7 layers", Example 11 was expressed as "$Ni_{0.875}Cu_{0.125}$ 6 layers", Example 12 was expressed as "$Ni_{0.875}Cu_{0.125}$ 8 layers", Example 13 was expressed as "$Ni_{0.875}Cu_{0.125}$ 9 layers", Example 14 was expressed as "$Ni_{0.875}Cu_{0.125}$ 12 layers", Example 15 was expressed as "$Ni_{0.875}Cu_{0.125}$ 4 layers", and Example 16 was expressed as "$Ni_{0.875}Cu_{0.125}$ 2 layers".

From FIG. 9, it was confirmed that the excess heat was generated in all of the heat generating elements 55 according to Examples 1, 9 to 16. When comparing the heat generating elements 55 according to Examples 1, 9 to 16 at a heater temperature of 840° C. or higher, it is found that the heat generating element 55 according to Example 11 in which the number of layers of the multilayer film 67 is 6 generates the largest excess heat and the heat generating element 55 according to Example 12 in which the number of layers of the multilayer film 67 is 8 generates the smallest excess heat. Thus, it is considered that the excess heat does not simply increase with respect to the number of layers of the multilayer film 67 since a wavelength of a behavior of a hydrogen wave in the multilayer film 67 is in a nanometer order and interferes with the multilayer film 67.

Next, the "relationship between a material of the multilayer film and the excess heat" will be described. The relationship between a type of a material for forming the third layer 77 and the excess heat was examined using the heat generating element 75 including the multilayer film 67 having the first layer 71 made of Ni, the second layer 72 made of Cu, and the third layer 77 made of a hydrogen storage metal, a hydrogen storage alloy, or ceramics different from the materials of the first layer 71 and the second layer 72.

Nine types of heat generating elements 75, in which the multilayer films 67 were formed under the same conditions except for types of the material for forming the third layer 77, were prepared and used as Examples 17 to 25. The types of the material for forming the third layer 77 in the heat generating elements 75 according to Examples 17 to 25 are respectively CaO, SiC, $Y_2O_3$, TiC, Co, $LaB_6$, ZrC, $TiB_2$, and CaOZrO.

Figure 10:
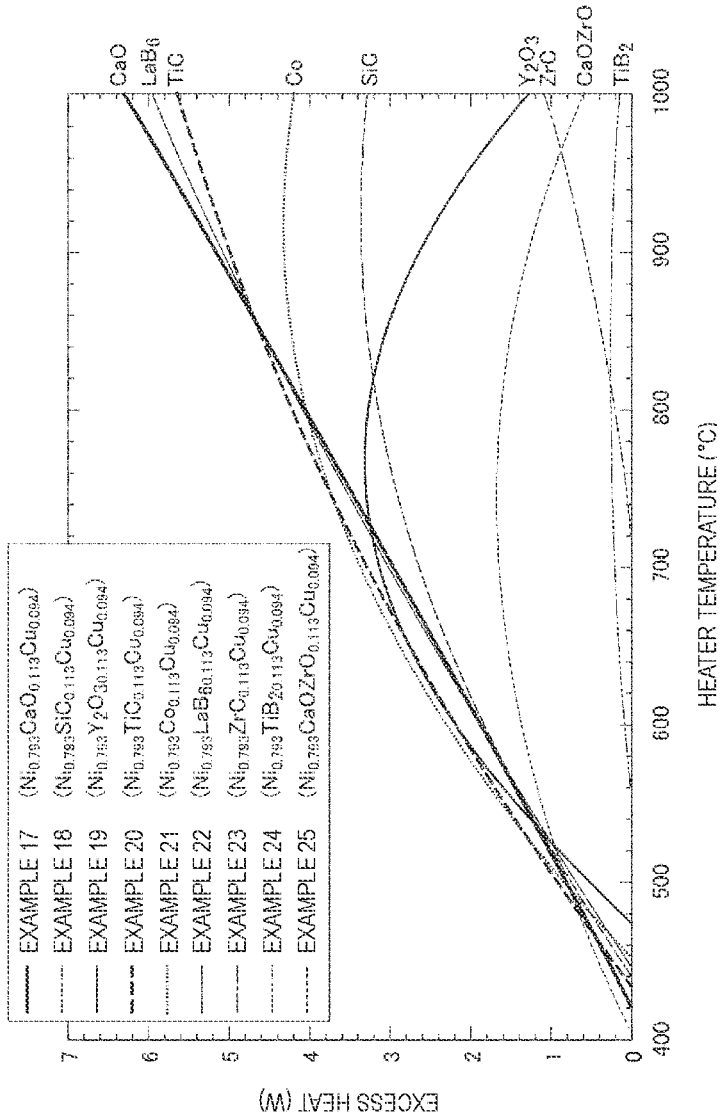
FIG. 10 is a graph showing a relationship between a material of the multilayer film and the excess heat.

Each of the heat generating elements 75 according to Examples 17 to 25 was provided inside a sealed container of an experimental heat generating device. The experimental heat generating device is the same as the device used to examine the above-described "relationship between a ratio of layer thicknesses of the multilayer film and the excess heat". In the experimental heat generating device, the temperature of each of the heat generating elements 75 during the hydrogen discharging step was measured by the same method as that for the above-described "relationship between a ratio of layer thicknesses of the multilayer film and the excess heat". Results are shown in FIG. 10. FIG. 10 is a graph obtained by fitting measured data by a predetermined method. In FIG. 10, a horizontal axis indicates a heater temperature and a vertical axis indicates electric power of excess heat. In FIG. 10, based on the thickness of each layer, Example 17 was expressed as "$Ni_{0.793}CaO_{0.113}Cu_{0.094}$", Example 18 was expressed as "$Ni_{0.793}SiC_{0.113}Cu_{0.094}$", Example 19 was expressed as "$Ni_{0.793}Y_2O_{30.113}Cu_{0.094}$", Example 20 was expressed as "$Ni_{0.793}TiC_{0.113}Cu_{0.094}$", Example 21 was expressed as "$Ni_{0.793}Co_{0.113}Cu_{0.094}$", Example 22 was expressed as "$Ni_{0.793}LaB_{60.113}Cu_{0.094}$", Example 23 was expressed as "$Ni_{0.793}ZrC_{0.113}Cu_{0.094}$", Example 24 was expressed as "$Ni_{0.793}TiB_{20.113}Cu_{0.094}$", and Example 25 was expressed as "$Ni_{0.793}CaOZrO_{0.113}Cu_{0.094}$".

From FIG. 10, it was confirmed that the excess heat was generated in all of the heat generating elements 75 according to Examples 17 to 25. In particular, when comparing Example 17 in which the material for forming the third layer 77 is CaO, Example 20 in which the material for forming the third layer 77 is TiC, and Example 22 in which the material for forming the third layer 77 is $LaB_6$ with Examples 18, 19, 21, 23 to 25, it is found that the excess heat increases in a substantially linear manner in a wide range in which the heater temperature is 400° C. or higher and 1000° C. or lower. Materials for forming the third layers 77 in Examples 17, 20, and 22 have a work function smaller than those of the materials in Examples 18, 19, 21, 23 to 25. Therefore, it is found that the type of the material for forming the third layer 77 preferably has a small work function. Based on the results, an electron density in the multilayer film 67 may contribute to a reaction that generates excess heat.

An example of the structure of the multilayer film 67 according to the temperature of the heat generating structure 20 will be described. For example, regarding the upper-stage, middle-stage, and lower-stage heat generating structures 20 shown in FIGS. 2 and 3, in consideration of the above-described "relationship between a ratio of layer thicknesses of the multilayer film and the excess heat", in the lower-stage heat generating structure 20 that is set to a low temperature (for example, in a range of 50° C. or higher and 500° C. or lower), the ratio of layer thicknesses of the multilayer film 67 is preferably in a range of 2:1 or more and 5:1 or less. In the middle-stage heat generating structure 20 at a medium temperature (for example, in a range of 500° C. or higher and 800° C. or lower), the ratio of layer thicknesses of the multilayer film 67 is preferably in a range of 5:1 or more and 6:1 or less. In the upper-stage heat generating structure 20 at a high temperature (for example, in a range of 800° C. or higher and 1500° C. or lower), the ratio of layer thicknesses of the multilayer film 67 is preferably in a range of 6:1 or more and 12:1 or less.

In consideration of the above-described "relationship between the number of layers of the multilayer film and the excess heat", in each of the heat generating structures 20 that are set to a low temperature, a medium temperature, and a high temperature, the number of layers of the first layer 71 of the multilayer film 67 is preferably in a range of 2 layers or more and 18 layers or less, and the number of layers of the second layer 72 is preferably in a range of 2 layers or more and 18 layers or less.

Figure 2:
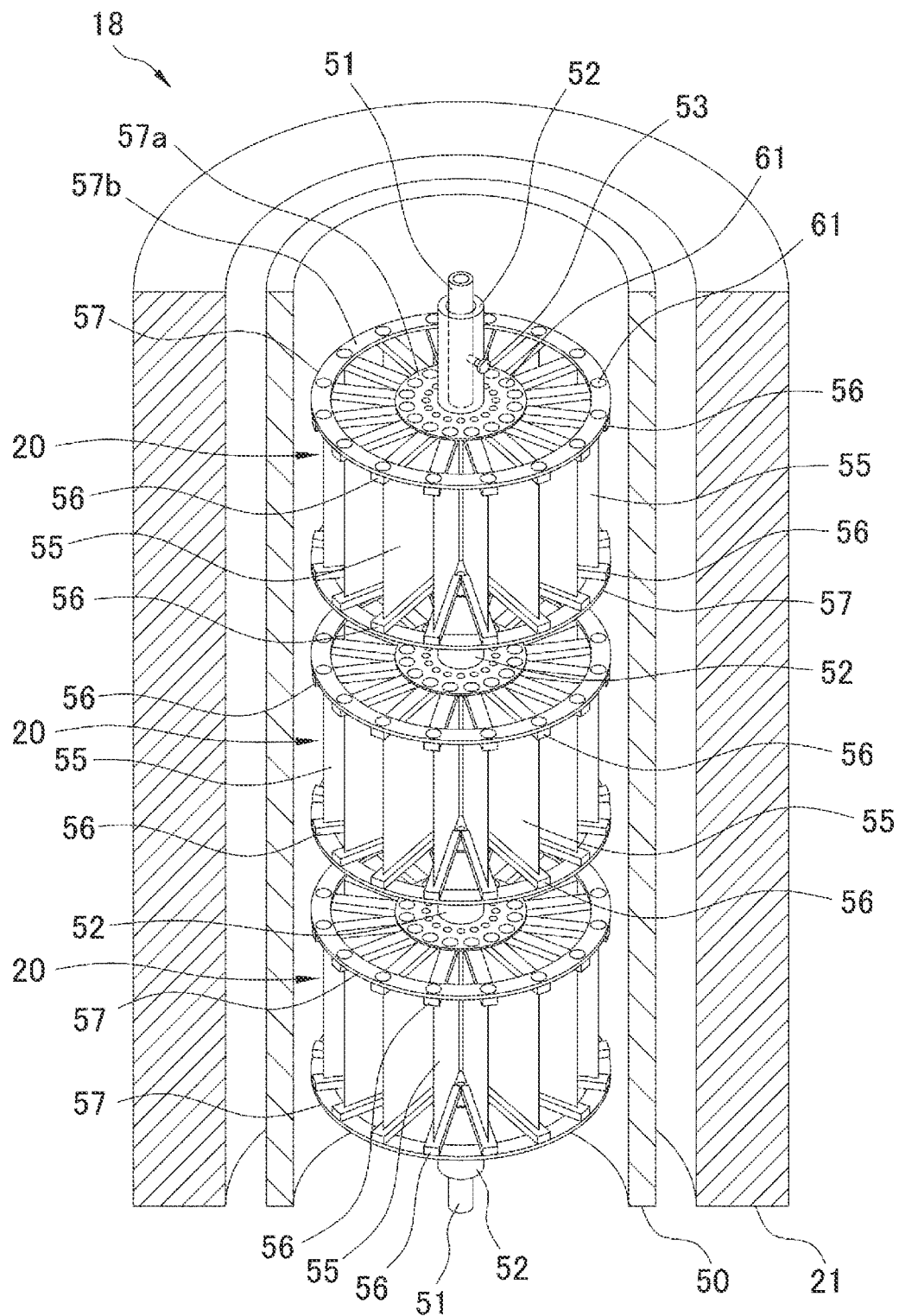
FIG. 2 is a perspective view showing a structure of a heat generating module.

When the heat generating element 75 is used in place of the heat generating element 55 in the upper-stage, middle-stage, and lower-stage heat generating structures 20 shown in FIGS. 2 and 3, in consideration of the above-described "relationship between the material of the multilayer film and the excess heat", the first layer 71 is preferably made of Ni, the second layer 72 is preferably made of Cu, and the third layer 77 is preferably made of $Y_2O_3$ in the lower-stage heat generating structure 20 which is set to a low temperature. In the middle-stage heat generating structure 20 that is set to a medium temperature, the first layer 71 is preferably made of Ni, the second layer 72 is preferably made of Cu, and the third layer 77 is preferably made of TiC. In the upper-stage heat generating structure 20 that is set to a high temperature, the first layer 71 is preferably made of Ni, the second layer 72 is preferably made of Cu, and the third layer 77 is preferably made of CaO or $LaB_6$.

In the first embodiment, the heat generating structure 20 has a configuration in which the plurality of heat generating elements 55 are radially arranged, whereas the arrangement of the heat generating elements 55 may be appropriately changed.

Figure 11:
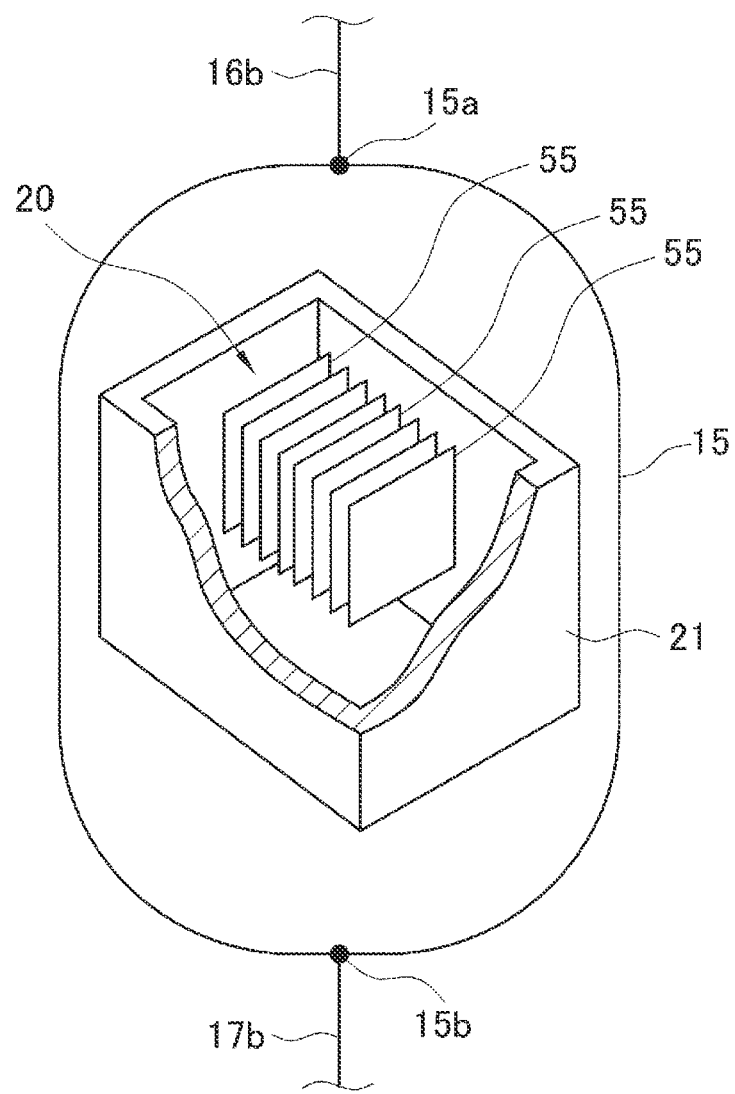
FIG. 11 is an explanatory diagram showing an example of an arrangement of the heat generating element.

For example, as shown in FIG. 11, a plurality of heat generating elements 55 are arranged in a line with a gap therebetween. In this case, it is preferable that the heater 21 has a square tubular shape. Accordingly, space saving can be achieved. The plurality of heat generating elements 55 are heated by the heat of the heater 21 and the heat of the adjacent heat generating elements 55. Accordingly, it is possible to reduce the input power supply of the heater 21 necessary to maintain the predetermined temperature.

An arrangement direction of the plurality of heat generating elements 55 is preferably a direction perpendicular to the direction in which the hydrogen-based gas flows inside the sealed container 15. In this case, the plurality of heat generating elements 55 are arranged upright along the direction in which the hydrogen-based gas flows inside the sealed container 15. Accordingly, for example, when the hydrogen occluded in the heat generating structure 20 is discharged, the hydrogen-based gas inside the sealed container 15 smoothly flows from the supply port 15b to the exhaust port 15a without being blocked by the heat generating element 55.

In the first embodiment, the heat generating element 55 is formed in a plate shape, whereas the shape of the heat generating element 55 may be appropriately changed.

Figure 12:
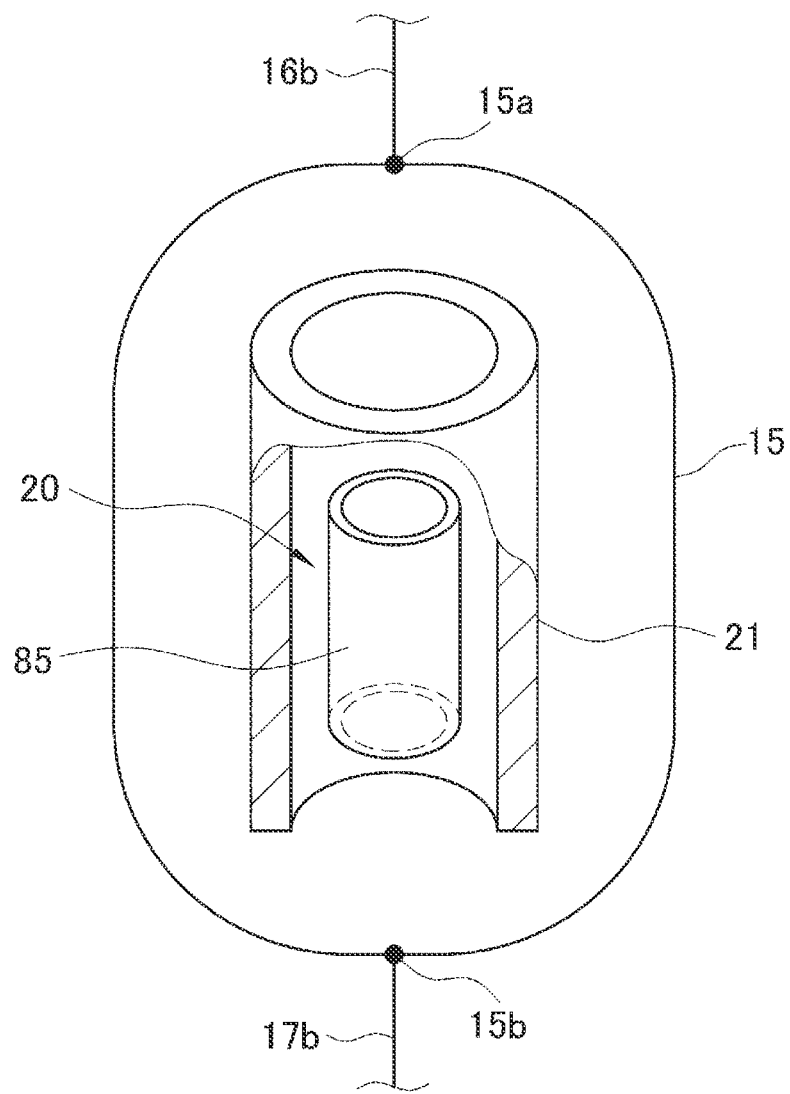
FIG. 12 is a schematic diagram showing a cylindrical heat generating element.

As shown in FIG. 12, a heat generating element 85 is formed in a cylindrical shape. The heat generating structure 20 shown in FIG. 12 includes the heat generating element 85 instead of the heat generating element 55. In FIG. 12, the heat generating element 85 has a cylindrical shape, whereas the heat generating element 85 may have a square tubular shape. By forming the heat generating element 85 in a cylindrical shape, the hydrogen-based gas flows through the gap formed between the inner surface of the heater 21 and an outer surface of the heat generating element 85 and through the inside of the heat generating element 85. An axial direction of the heat generating element 85 is preferably parallel to the direction in which the hydrogen-based gas flows inside the sealed container 15. Accordingly, for example, when the hydrogen occluded in the heat generating structure 20 is discharged, the hydrogen-based gas inside the sealed container 15 smoothly flows from the supply port 15b to the exhaust port 15a without being blocked by the heat generating element 85.

Figure 13:
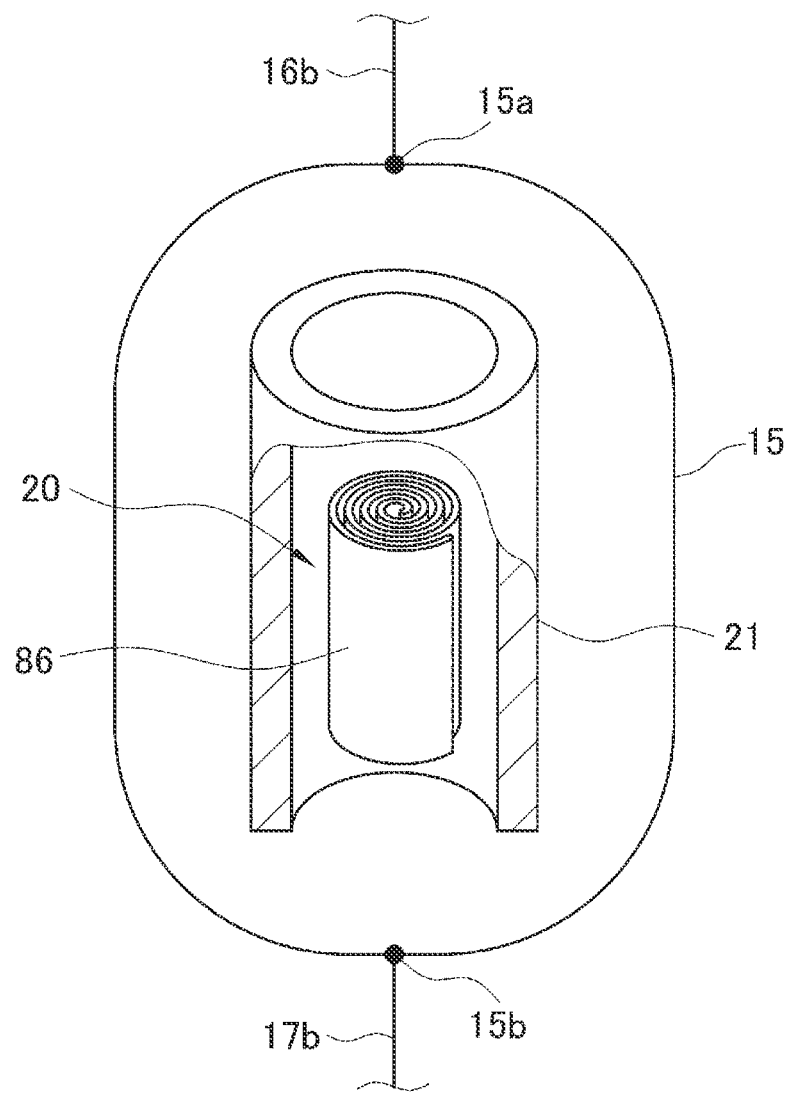
FIG. 13 is a schematic diagram showing a spiral heat generating element wound in a sparsely wound manner.

As shown in FIG. 13, a heat generating element 86 is formed in a spiral shape by being wound in a sparsely wound manner. The heat generating structure 20 shown in FIG. 13 includes the heat generating element 86 instead of the heat generating element 55. By sparsely winding the heat generating element 86, the hydrogen-based gas flows through the gap formed inside the heat generating element 86. The number of turns of the heat generating element 86 may be appropriately changed. For example, by increasing the number of turns of the heat generating element 86, a contact area between the heat generating element 86 and the hydrogen-based gas increases, so that the output of excess heat can be increased. Therefore, in the heat generating element 86 formed in a spiral shape, the output of excess heat can be adjusted in accordance with the number of turns.

The heat generating element is not limited to a plate shape, tubular shape, or spiral shape, and may be, for example, a powder made of a hydrogen storage metal or a hydrogen storage alloy.

In the first embodiment, one heater 21 is used to heat the three heat generating structures 20, whereas a plurality of heaters 21 may be used. For example, the three heat generating structures 20 are heated by using three heaters 21. In this case, the control unit 19 may control the output of the excess heat for each of the heat generating structures 20 by adjusting the input electric power of each of the heaters 21 based on the temperature detected by the temperature sensor 22 provided in each of the heat generating structures 20. For example, the control unit 19 increases the output of the excess heat of the lower-stage heat generating structure 20 by increasing the input electric power of the heater 21 corresponding to the lower-stage heat generating structure 20. The control unit 19 reduces the input electric power of the heater 21 corresponding to the upper-stage heat generating structure 20 to reduce the output of the excess heat of the upper-stage heat generating structure 20. Accordingly, the output of the excess heat of the plurality of heat generating structures 20 as a whole is controlled.

In the first embodiment, the heat utilization device 12 includes the accommodation container 31, the heat medium circulation unit 32, the gas turbine 33, the steam generator 34, the steam turbine 35, the Stirling engine 36, and the thermoelectric converter 37, whereas the configuration of the heat utilization device 12 is not limited thereto. For example, when a hydrogen-based gas is used as the heat medium, the accommodation container 31 can be omitted in the heat utilization device 12 by connecting the heat medium circulation unit 32 to the sealed container 15 of the heat generating device 11.

Figure 14:
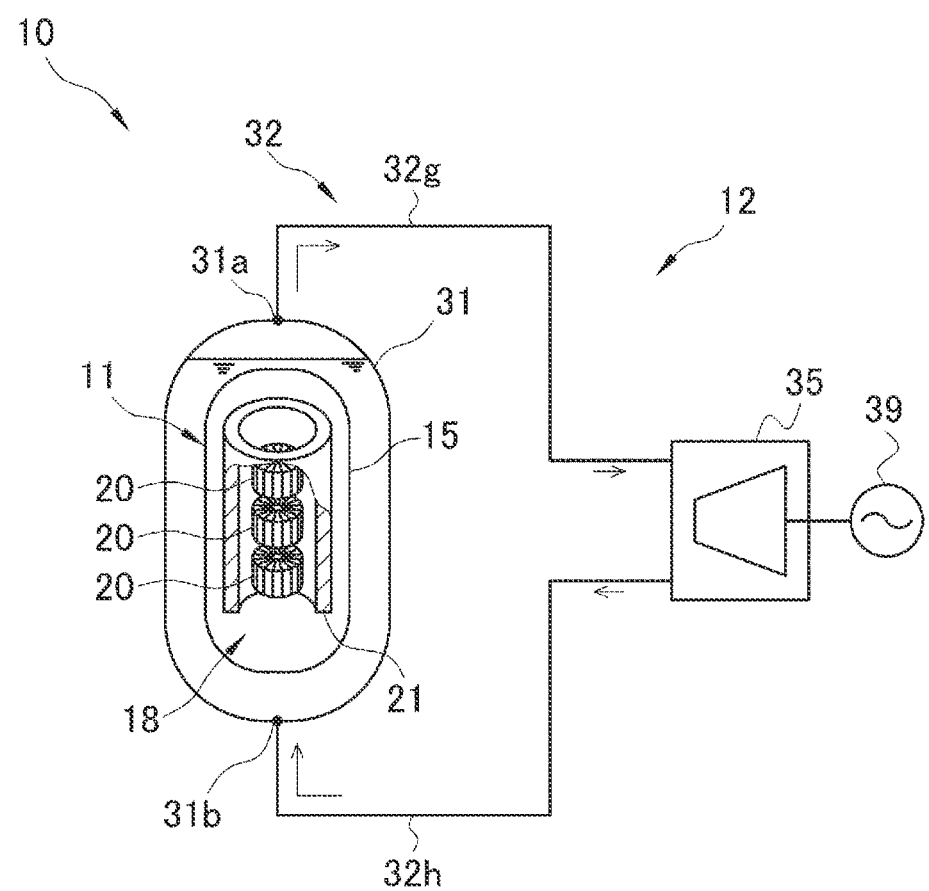
FIG. 14 is an explanatory diagram showing an example of a heat utilization device.

As shown in FIG. 14, the heat utilization device 12 includes the accommodation container 31, the heat medium circulation unit 32, and the steam turbine 35, and may use water as the heat medium. In FIG. 14, the gas exhaust unit 16, the gas supply unit 17, the control unit 19, and the like of the heat generating device 11 are not shown. Water is supplied into the accommodation container 31. A space is formed above a water surface in the accommodation container 31. In the accommodation container 31, heat exchange is performed between water and the heat generating structure 20, and water is boiled to generate steam. The heat medium circulation unit 32 includes a steam pipe 32g and a water supply pipe 32h instead of the first pipe 32a, the second pipe 32b, the third pipe 32c, the fourth pipe 32d, the pump 32e, and the heat medium flow rate control unit 32f. The steam pipe 32g supplies the steam generated in the accommodation container 31 to the steam turbine 35. The water supply pipe 32h includes a condenser (not shown) and a water supply pump (not shown). The steam discharged from the steam turbine 35 is cooled by the condenser and returned to water, and the water is supplied to the accommodation container 31 via the water supply pump.

The heat utilization device 12 may only include the accommodation container 31 and the heat medium circulation unit 32. The heat medium flowing through the heat medium circulation unit 32 is used for various purposes such as household heating, a household water heater, an automobile heater, an agricultural heating machine, a road heater, a seawater desalination heat source, and a geothermal power generation auxiliary heat source.

In the first embodiment, the gas turbine 33 is connected to the power generator 38 and is used as power for power generation, whereas the gas turbine 33 may be used as a motor without being connected to the power generator 38. Similarly, the steam turbine 35 may be used as a motor without being connected to the power generator 39. The Stirling engine 36 may be used as a motor without being connected to the power generator 40.

2. Second Embodiment

Heat generated by a heat generating element can be used for preheating combustion air in a combustion device that combusts fuel and the combustion air to generate heat. Examples of the combustion device include a boiler, a rotary kiln, a metal heat treatment furnace, a heating furnace for metal processing, a hot air furnace, a firing furnace for ceramic, a petroleum refining tower, a dry distillation furnace, and a drying furnace. Hereinafter, a case where the combustion air to be supplied to the boiler as the combustion device is preheated using the heat generated by the heat generating element will be described.

Figure 15:
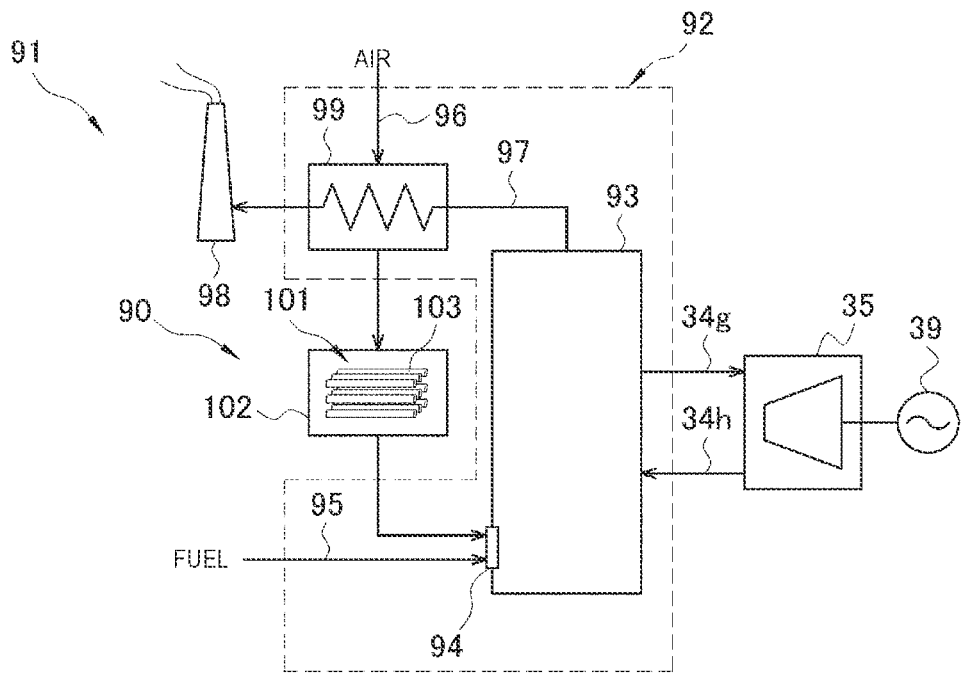
FIG. 15 is a schematic diagram showing a configuration of a thermal power generation plant including a heat utilization system according to a second embodiment.

FIG. 15 is a schematic diagram showing a configuration of a thermal power generation plant 91 including a heat utilization system 90. Hereinafter, the thermal power generation plant 91 will be described.

The thermal power generation plant 91 includes a boiler 92, the steam turbine 35, and the power generator 39. In the thermal power generation plant 91, steam generated in the boiler 92 is supplied to the steam turbine 35 through a steam pipe 34g, and the steam rotates the steam turbine 35 to drive the power generator 39 connected to the rotation shaft of the steam turbine 35 to generate power. The steam rotating the steam turbine 35 is sent to a water supply pipe 34h, cooled by a condenser (not shown), and returned to water. The water generated by the condenser is sent to the boiler 92 by a water supply pump (not shown).

In the boiler 92, the fuel and the combustion air are burnt to generate the heat, and the steam is generated from the water by the heat. The boiler 92 includes a furnace 93, a burner 94, a fuel supply line 95, and an air supply line 96.

The furnace 93 is a tubular hollow body that causes the fuel and the combustion air to react with each other and to combust. The furnace 93 may have various shapes such as a cylindrical shape and a square tubular shape. Water is supplied to the furnace 93 from a water supply pump (not shown) provided in the water supply pipe 34h.

The burner 94 is constituted to supply the fuel and the combustion air into the furnace 93 from the outside of the furnace 93. The burner 94 is provided in a lower portion of the furnace 93. The burner 94 burns the fuel to generate a high-temperature combustion gas. Water in the boiler 92 is evaporated by the heat of the combustion gas, and high-temperature and high-pressure steam is generated. The combustion gas passes through a flue 97 provided above the furnace 93, and is discharged as an exhaust gas from a chimney 98 to the atmosphere.

The fuel supply line 95 supplies the fuel to the burner 94. As the fuel, fossil fuel such as coal, natural gas, petroleum, liquefied natural gas (LNG), and liquefied petroleum gas (LPG) is used. Coal is pulverized coal pulverized in advance. The natural gas is a shear gas or the like, and includes fuel derived from a natural gas such as methane hydrate. Examples of the petroleum include heavy oil and light oil. Biomass (woody chip or the like) may be used as the fuel. When the pulverized coal is used as the fuel, the fuel supply line 95 supplies a mixed gas obtained by mixing the pulverized coal with a carrier gas such as air to the burner 94. When the coal, the woody chip, or the like is used as the fuel, a fluidized bed boiler or a fixed bed boiler (a stoker furnace or the like) may be used. In this case, the fuel may be supplied into the furnace and only the preheated air may be blown from the burner or the like.

The air supply line 96 supplies the combustion air to the burner 94. The air supply line 96 takes in outside air from the outside of the boiler 92 by a forced draft fan (not shown) or the like.

The air supply line 96 includes a heat exchanger 99. The heat exchanger 99 is provided in the flue 97. The heat exchanger 99 performs heat exchange between the outside air taken into the air supply line 96 from the outside of the boiler 92 and the exhaust gas circulating through the flue 97. The outside air taken into the air supply line 96 is preheated by the heat exchanger 99 to generate preheated air. The preheated air generated in the heat exchanger 99 is supplied to a heat utilization device 102 to be described later.

Next, the heat utilization system 90 will be described. The heat utilization system 90 includes a heat generating device 101, the boiler 92, and the heat utilization device 102. The heat utilization system 90 heats the preheated air supplied to the heat utilization device 102 by using the heat generated by a heat generating element 105 (see FIG. 16) of the heat generating device 101.

Figure 16:
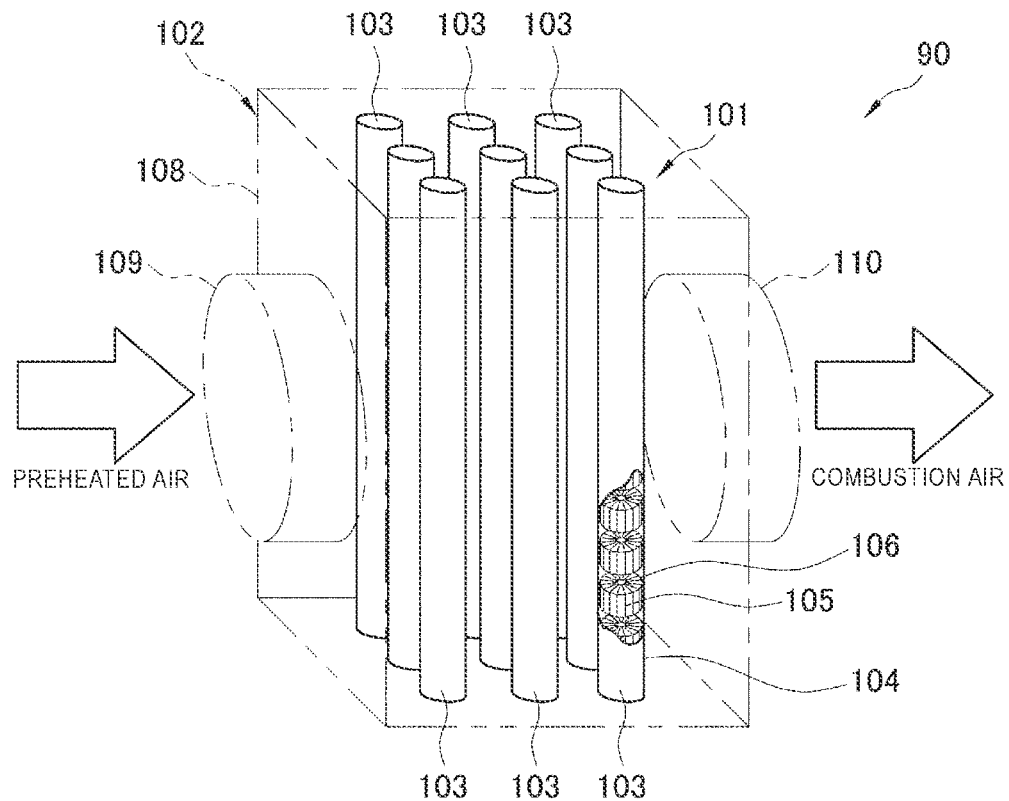
FIG. 16 is a perspective view schematically showing a configuration of a heat generating device and a heat utilization device.

As shown in FIG. 16, the heat generating device 101 includes a plurality of heat generating element units 103. FIG. 16 is a perspective view schematically showing configurations of the heat generating device 101 and the heat utilizing device 102. In FIG. 16, a part of one heat generating element unit 103 is cut out and the inside thereof is shown. The heat generating element units 103 are arranged with a gap therebetween. Each of the heat generating element units 103 is detachably supported by a support body (not shown). The number of the heat generating element units 103 is not particularly limited, and can be appropriately changed so as to obtain a desired output. In FIG. 16, nine heat generating element units 103 are used.

The heat generating element unit 103 includes a sealed container 104 to which a hydrogen-based gas is supplied, and a heat generating structure 106 that is accommodated in the sealed container 104 and includes a heat generating element 105 that generates heat by occluding and discharging hydrogen contained in the hydrogen-based gas.

The sealed container 104 is a tubular hollow body. The sealed container 104 may have various shapes such as a cylindrical shape and a square tubular shape. The sealed container 104 has a cylindrical shape in this example. A plurality of heat generating structures 106 are arranged in the sealed container 104.

The heat generating element 105 may have the same configuration as, for example, the heat generating element 55 (see FIG. 4), the heat generating element 85 (see FIG. 12), and the heat generating element 86 (see FIG. 13). In this example, the shape of the heat generating element 105 is a plate shape similar to the heat generating element 55. A plurality of heat generating elements 105 are radially arranged to constitute the heat generating structure 106.

The heat generating element 105 occludes hydrogen contained in the hydrogen-based gas in the sealed container 104. The heat generating element 105 generates heat by the movement of the occluded hydrogen due to a temperature difference between the temperature of the heat generating element 105 and the temperature of the preheated air supplied to the heat utilization device 102. For example, when the temperature of the heat generating element 105 is normal temperature (for example, 25° C.) and the temperature of the preheated air supplied to the heat utilization device 102 is, for example, 250° C., at the start of the operation of the heat utilization device 102, the temperature difference occurs between the heat generating element 105 and the preheated air, and thus the heat generating element 105 starts to generate heat. Thereafter, the temperature of the heat generating element 105 is increased to, for example, 500° C. to 800° C., and the temperature difference between the heated heat generating element 105 and the preheated air is generated, so that the heat generation of the heat generating element 105 is continued. In this way, the heat generating device 101 generates heat by the temperature difference between the heat generating element 105 and the preheated air without repeatedly supplying and exhausting the hydrogen-based gas.

The heat utilization device 102 includes a case 108 that accommodates the heat generating device 101, an air inlet 109 that is connected to the heat exchanger 99, and an air outlet 110 that is connected to the burner 94. The preheated air generated in the heat exchanger 99 is supplied through the air inlet 109 into the case 108, and is heated by the heat of the heat generating element 105 when passing through the gap formed between the heat generating element units 103. The preheated air heated by the heat generating element 105 is discharged as combustion air through the air outlet 110. In this way, the heat utilization device 102 functions as an air preheater that preheats the combustion air by using the heat of the heat generating element 105.

As described above, the heat utilization system 90 is applied to the thermal power generation plant 91, and preheats the combustion air by using the heat of the heat generating element 105. Therefore, combustion efficiency in the boiler 92 can be improved and the amount of the fuel to be used can be reduced.

In the heat utilization system. 90, since each of the heat generating element units 103 is detachable, each of the heat generating element units 103 can be individually replaced. Therefore, the heat generation of the heat generating device 101 can be stabilized by removing the heat generating element unit 103 that no longer generates heat and replacing the heat generating element unit 103 with a new heat generating element unit 103. Further, all of the heat generating element units 103 can be replaced at the same time.

Figure 17:
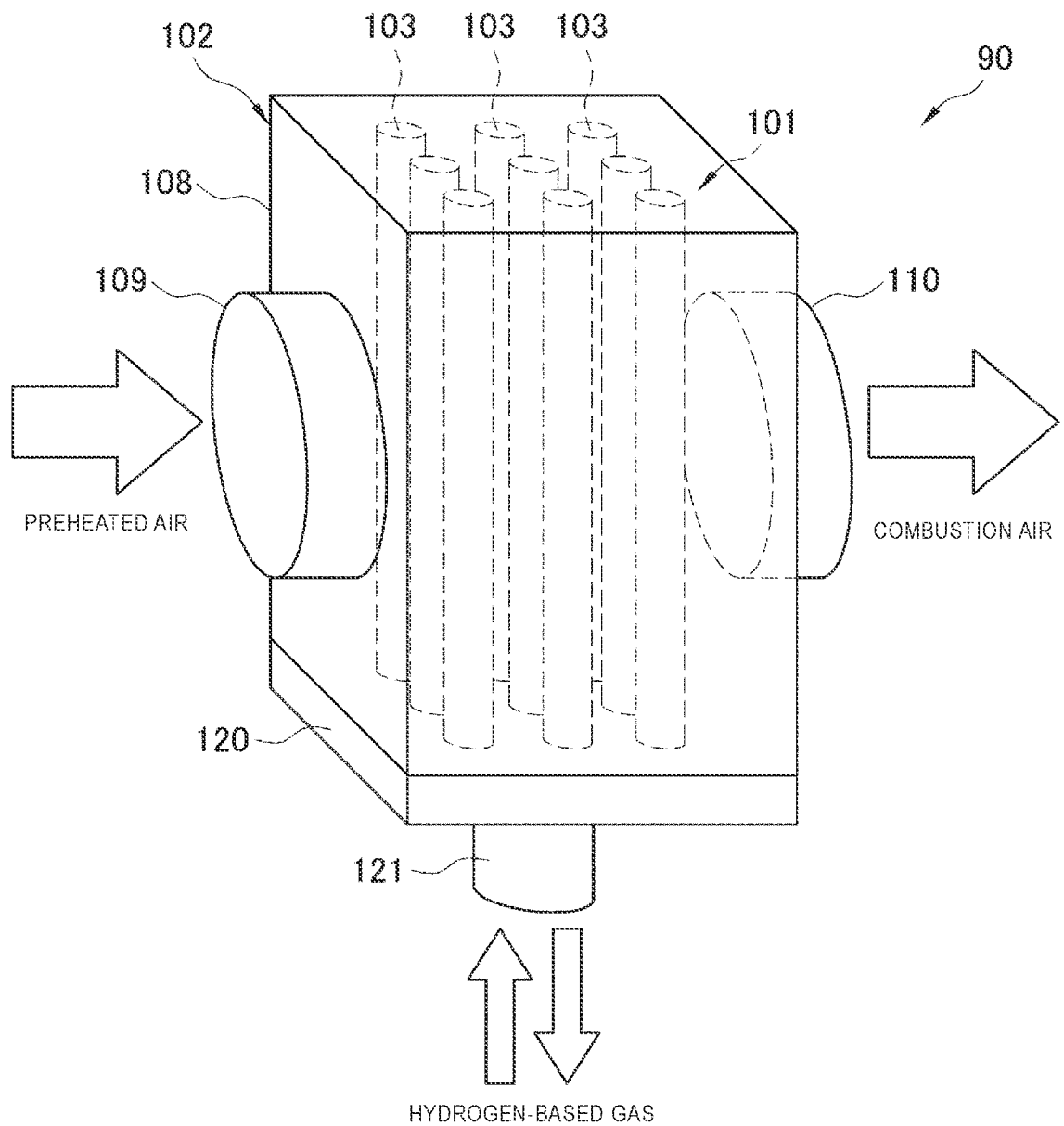
FIG. 17 is an explanatory diagram showing a heat generating device constituted to repeatedly perform supply and exhaust of a hydrogen-based gas.

The heat generating device 101 may be constituted such that the supply and the exhaust of the hydrogen-based gas are repeatedly performed. As shown in FIG. 17, the heat generating device 101 further includes, in addition to the plurality of heat generating element units 103, a hydrogen-based gas supply and exhaust header 120 connected to each sealed container 104, and a hydrogen pipe 121 connected to the hydrogen-based gas supply and exhaust header 120. The hydrogen pipe 121 is connected to a gas supply unit and a gas exhaust unit (both not shown). The gas supply unit supplies the hydrogen-based gas into the sealed container 104 via the hydrogen-based gas supply and exhaust header 120 and the hydrogen pipe 121. The gas exhaust unit vacuum-evacuates the inside of the sealed container 104 via the hydrogen-based gas supply and exhaust header 120 and the hydrogen pipe 121. By repeatedly supplying and exhausting the hydrogen-based gas, it is possible to reliably cause the heat generating element 105 to generate heat.

The structure of the heat generating element unit 103 shown in FIG. 16 is an example. That is, the heat generating element unit 103 is not limited to the case where the heat generating element unit 103 includes the heat generating structure 106 in which the plurality of heat generating elements 105 are radially arranged. The arrangement of the plurality of heat generating elements 105 is not limited to a radial arrangement, and can be appropriately changed.

Figure 18:
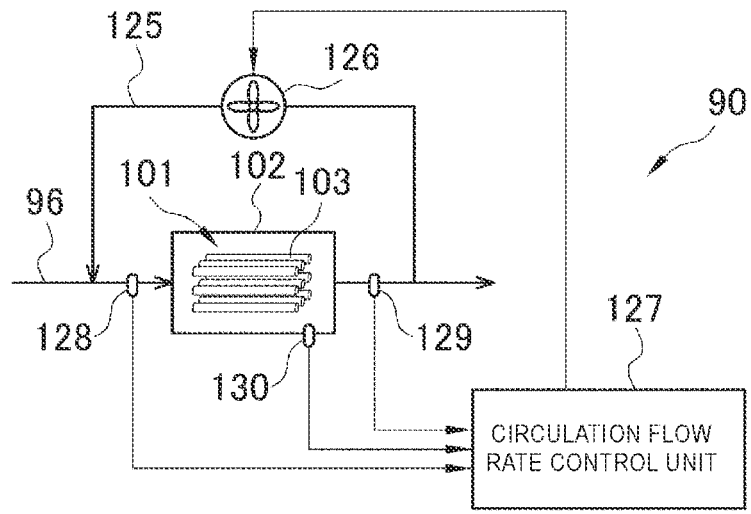
FIG. 18 is an explanatory diagram showing a heat utilization system constituted to circulate combustion air.

The heat utilization system 90 may be constituted to circulate the combustion air discharged from the heat utilization device 102. As shown in FIG. 18, the heat utilization system 90 further includes a combustion air circulation line 125 in which the combustion air circulates, a flow rate variable circulation fan 126 that is provided in the combustion air circulation line 125, and a circulation flow rate control unit 127 that drives the flow rate variable circulation fan 126 and controls a circulation flow rate of the combustion air.

The air supply line 96 is provided with a temperature sensor 128 that measures the temperature of the combustion air supplied to the heat utilization device 102, and a temperature sensor 129 that measures the temperature of the combustion air discharged from the heat utilization device 102. The heat utilization device 102 is provided with a temperature sensor 130 that measures the temperature of the heat generating element 105 of the heat generating element unit 103 or the temperature of a specific portion enabling estimation of the temperature of the heat generating element 105. The circulation flow rate control unit 127 is electrically connected to the temperature sensors 128 to 130, and controls the circulation flow rate of the combustion air by driving the flow rate variable circulation fan 126 based on the temperatures detected by the temperature sensors 128 to 130.

For example, the circulation flow rate control unit 127 decreases the temperature of the heat generating element 105 by increasing the circulation flow rate of the combustion air when the temperature of the heat generating element 105 exceeds a predetermined temperature. The circulation flow rate control unit 127 increases the temperature of the heat generating element 105 by decreasing the circulation flow rate of the combustion air when the temperature of the heat generating element 105 is equal to or lower than the predetermined temperature.

A flow rate sensor (not shown) that measures the flow rate of the combustion air may be provided in the air supply line 96 or the combustion air circulation line 125, and the circulation flow rate of the combustion air may be controlled based on the temperature and the flow rate of the combustion air.

The air supply line 96 may be provided with a heater (not shown) for heating the combustion air. The heater can increase the temperature of the heat generating element 105. When the temperature of the heat generating element 105 increases to the predetermined temperature, the heat generating element 105 starts to generate heat. The heater is operated, for example, when the operation of the heat utilization system 90 is started or when the temperature of the heat generating element 105 decreases.

The heat utilization device 102 is not limited to the case where the preheated air generated in the heat exchanger 99 is heated by using the heat of the heat generating element 105. For example, the heat utilization device 102 may heat the outside air taken into the air supply line 96 from the outside of the boiler 92. In this case, the outside air heated by the heat of the heat generating element 105 may be used as the combustion air without providing the heat exchanger 99.

The combustion air may be mixed with the exhaust gas. For example, the flue 97 is branched and connected to the air supply line 96, and the exhaust gas is recirculated, so that the exhaust gas can be mixed with the combustion air. The heat utilization device 102 may preheat the combustion air mixed with the exhaust gas.

The heat utilization device 102 may preheat water generated by a condenser (not shown) by rotating the steam turbine 35 in addition to or instead of preheating the combustion air used in the boiler 92 as a combustion device. By returning the preheated water to the boiler 92, the combustion efficiency in the boiler 92 is increased, and the amount of fuel to be used can be reduced.

3. Third Embodiment

Exhaust gas discharged from a combustion device such as the boiler 92 according to the second embodiment usually contains carbon dioxide ($CO_2$). As a technique for collecting $CO_2$ from the exhaust gas, carbon dioxide capture and storage (CCS) is known. The CCS is a technique of separating and collecting $CO_2$ from the exhaust gas and storing the collected $CO_2$ in the ground or the like to reduce the amount of $CO_2$ discharging to an atmosphere. Examples of a method for collecting $CO_2$ include a chemical absorption method and a physical adsorption method. In the chemical absorption method, $CO_2$ contained in the exhaust gas is absorbed by an absorption liquid such as an amine compound aqueous solution, and $CO_2$ is discharged from the absorption liquid by heating the absorption liquid that has absorbed $CO_2$. In the physical adsorption method, $CO_2$ contained in the exhaust gas is adsorbed to an adsorbent such as activated carbon or zeolite, and $CO_2$ is desorbed from the adsorbent by heating the adsorbent to which $CO_2$ is adsorbed.

In the third embodiment, a heat medium heated by heat generated by a heat generating element is used as a heat source for heating the absorption liquid that has absorbed $CO_2$ in the chemical absorption method. Hereinafter, a case where the chemical absorption method is performed will be described. However, the heat medium heated by the heat generated by the heat generating element can also be used as a heat source for heating the adsorbent to which $CO_2$ is adsorbed in the physical adsorption method.

Figure 19:
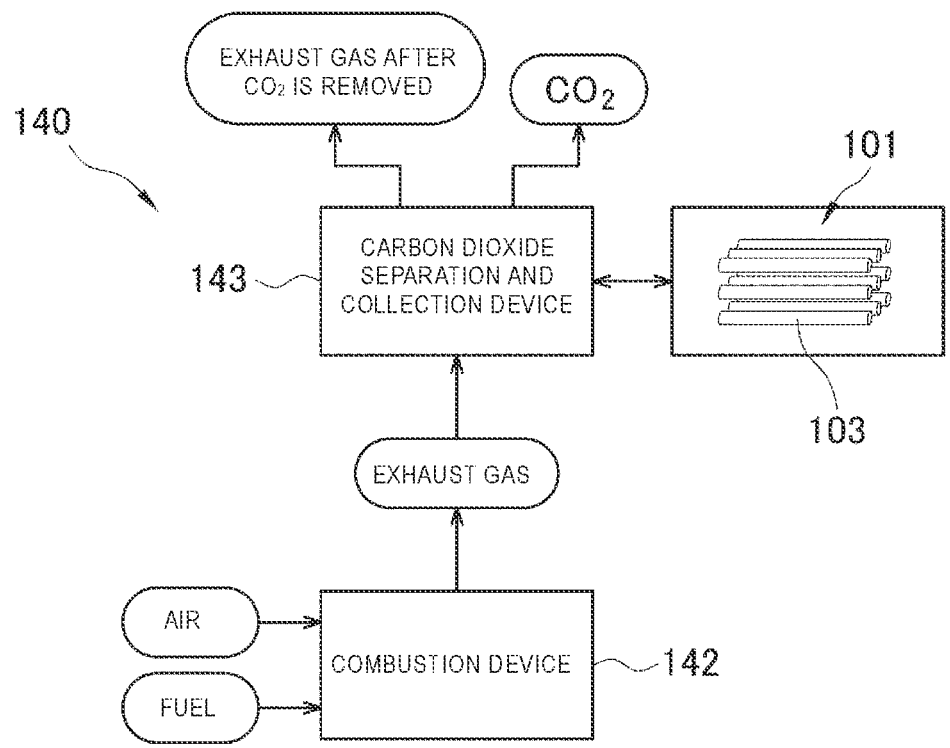
FIG. 19 is a schematic diagram showing a configuration of a heat utilization system according to a third embodiment.

As shown in FIG. 19, a heat utilization system 140 includes the heat generating device 101 (see FIG. 16), a boiler 142, and a carbon dioxide separation and collection device 143. Since the heat generating device 101 has the same configuration as that of the second embodiment, the description thereof will be omitted.

The boiler 142 is an example of a combustion device that generates heat by combusting fuel and combustion air. The exhaust gas discharged from the boiler 142 contains carbon dioxide ($CO_2$). The boiler 142 may have, for example, the same configuration as that of the boiler 92 according to the second embodiment.

The carbon dioxide separation and collection device 143 separates and collects $CO_2$ contained in the exhaust gas discharged from the boiler 142 as a combustion device by using, as a heat source, the heat medium heated by the heat of the heat generating element 105 (see FIG. 16) of the heat generating device 101. In this example, a case where the chemical absorption method is performed as a method of collecting $CO_2$ will be described.

Figure 20:
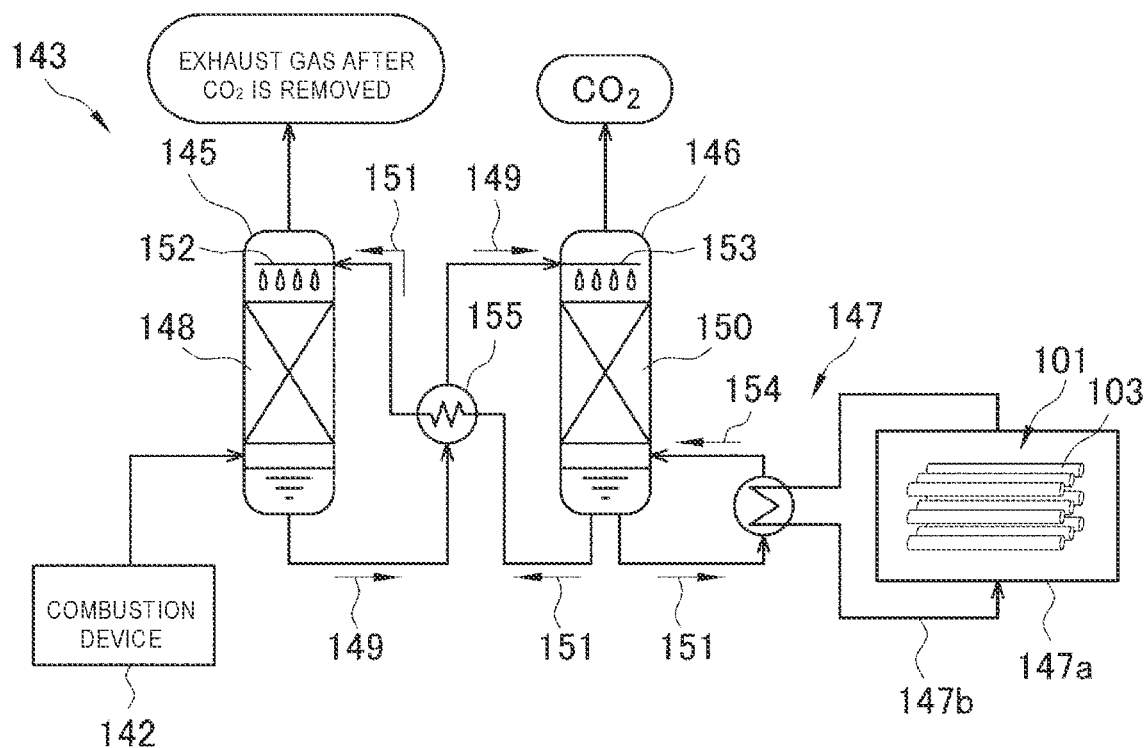
FIG. 20 is an explanatory diagram showing a configuration of a carbon dioxide separation and collection device.

As shown in FIG. 20, the carbon dioxide separation and collection device 143 includes an absorption tower 145, a regeneration tower 146, and a reboiler 147. The absorption tower 145 includes an absorption unit 148 that causes the absorption liquid to absorb $CO_2$ contained in the exhaust gas discharged from the boiler 142. The absorption tower 145 supplies the absorption liquid having $CO_2$ absorbed in the absorption unit 148 to the regeneration tower 146. The absorption liquid that has absorbed $CO_2$ is referred to as a rich liquid. In FIG. 20, the rich liquid is denoted by reference numeral 149. The regeneration tower 146 includes a regeneration unit 150 that discharges $CO_2$ from the absorption liquid supplied from the absorption tower 145 to regenerate the absorption liquid. The regeneration tower 146 supplies the absorption liquid from which $CO_2$ is discharged in the regeneration unit 150 to the absorption tower 145. The absorption liquid from which $CO_2$ is discharged is referred to as a lean liquid. In FIG. 20, the lean liquid is denoted by reference numeral 151.

In the carbon dioxide separation and collection device 143, the rich liquid 149 is sent from the absorption tower 145 to the regeneration tower 146, and the lean liquid 151 is returned from the regeneration tower 146 to the absorption tower 145. In this way, the carbon dioxide separation and collection device 143 is constituted to circulate the absorption liquid. Although not shown, a rich liquid delivery pump for delivering the rich liquid 149 from the absorption tower 145 to the regeneration tower 146, a lean liquid delivery pump for delivering the lean liquid 151 from the regeneration tower 146 to the absorption tower 145, and the like are provided between the absorption tower 145 and the regeneration tower 146.

The absorption tower 145 further includes a lean liquid supply nozzle 152 constituted to discharge the lean liquid 151 supplied from the regeneration tower 146. The lean liquid supply nozzle 152 is provided above the absorption unit 148, and drops the lean liquid 151 toward the absorption unit 148.

The exhaust gas containing $CO_2$ is supplied from the boiler 142 to a lower portion of the absorption unit 148 of the absorption tower 145. The exhaust gas supplied to the absorption tower 145 rises toward the absorption unit 148.

In the absorption unit 148, the exhaust gas containing $CO_2$ comes into contact with the lean liquid 151. The absorption unit 148 causes $CO_2$ contained in the exhaust gas to be absorbed by the lean liquid 151, thereby causing the lean liquid 151 to become the rich liquid 149. The rich liquid 149 is discharged from the bottom of the absorption tower 145 and supplied to the regeneration tower 146. $CO_2$ is removed from the exhaust gas in contact with the lean liquid 151. The exhaust gas after the removal of $CO_2$ is discharged from the top portion of the absorption tower 145 to the atmosphere.

The regeneration tower 146 further includes a rich liquid supply nozzle 153 constituted to discharge the rich liquid 149 supplied from the absorption tower 145. The rich liquid supply nozzle 153 is provided above the regeneration unit 150, and drops the rich liquid 149 toward the regeneration unit 150.

The reboiler 147 is coupled to the regeneration tower 146. The reboiler 147 heats the lean liquid 151 in the regeneration tower 146 and generates absorption liquid steam 154 by evaporating the lean liquid 151.

The reboiler 147 includes an accommodation container 147a that accommodates the heat generating device 101, and a heat medium circulation unit 147b that circulates the heat medium between the inside and the outside of the accommodation container 147a. The heat medium is heated by passing through a gap formed by an inner surface of the accommodation container 147a and an outer surface of the sealed container 104 (see FIG. 16) of the heat generating device 101. The reboiler 147 heats the lean liquid 151 by using, as a heat source, the heat medium heated by the heat of the heat generating element 105 (see FIG. 16) of the heat generating device 101.

Although not shown, the heat medium circulation unit 147b is provided with a flow rate variable fan and a flow rate control unit. The reboiler 147 adjusts the temperature of the heat medium to a predetermined temperature by driving the flow rate variable fan and controlling the flow rate of the heat medium by the flow rate control unit. In this example, the temperature of the heat medium is adjusted such that the lean liquid 151 evaporates to become the absorption liquid steam 154.

The absorption liquid steam 154 generated in the reboiler 147 is supplied to a lower portion of the regeneration unit 150 of the regeneration tower 146. The absorption liquid steam 154 supplied to the regeneration tower 146 rises toward the regeneration unit 150.

In the regeneration unit 150, the absorption liquid steam 154 and the rich liquid 149 come into contact with each other. The regeneration unit 150 heats the rich liquid 149 by the absorption liquid steam 154 and discharges $CO_2$ from the rich liquid 149, so that the rich liquid 149 becomes the lean liquid 151. That is, the rich liquid 149 is regenerated into the lean liquid 151. The lean liquid 151 is discharged from the bottom of the regeneration tower 146, a part of which is supplied to the absorption tower 145, and a remaining part of which is supplied to the reboiler 147. The absorption liquid steam 154 in contact with the rich liquid 149 is discharged from the top portion of the regeneration tower 146 together with $CO_2$ discharged from the rich liquid 149.

A heat exchanger 155 is provided between the absorption tower 145 and the regeneration tower 146. The heat exchanger 155 performs heat exchange between the rich liquid 149 supplied from the absorption tower 145 to the regeneration tower 146 and the lean liquid 151 supplied from the regeneration tower 146 to the absorption tower 145. Accordingly, the rich liquid 149 is heated, and the lean liquid 151 is cooled.

The carbon dioxide separation and collection device 143 further includes, for example, a separation drum (not shown), and introduces the absorption liquid steam 154 and $CO_2$ discharged from the top portion of the regeneration unit 150 into the separation drum. The absorption liquid steam 154 and $CO_2$ introduced into the separation drum are separated into water and $CO_2$ by cooling the absorption liquid steam 154 to become water. In this way, the carbon dioxide separation and collection device 143 can separate and collect $CO_2$ from the exhaust gas of the boiler 142. The carbon dioxide separation and collection device 143 is a heat utilization device that uses, as a heat source, the heat medium heated by the heat of the heat generating element 105 (see FIG. 16) of the heat generating device 101 for the separation and collection of $CO_2$ described above.

As described above, since the heat utilization system 140 uses the heat generating element 105 as the heat source for separating and collecting $CO_2$ contained in the exhaust gas discharged from the boiler 142 as a combustion device, the amount of $CO_2$ discharging into the atmosphere can be reduced.

4. Fourth Embodiment

Carbon dioxide ($CO_2$) separated and collected by the carbon dioxide separation and collection device 143 or the like according to the third embodiment can be converted into methane ($CH_4$) by reacting with hydrogen ($H_2$). $CH_4$ is generated from a raw material gas containing $CO_2$ and $H_2$ by bringing the raw material gas into contact with a catalyst using a catalyst that causes a reaction (methanation reaction) between $CO_2$ and $H_2$ to proceed. However, when a temperature of the raw material gas is low, the reaction does not sufficiently proceed. In the fourth embodiment, the raw material gas containing $CO_2$ and $H_2$ is heated by using, as a heat source, the heat medium heated by the heat generated by the heat generating element.

Figure 21:
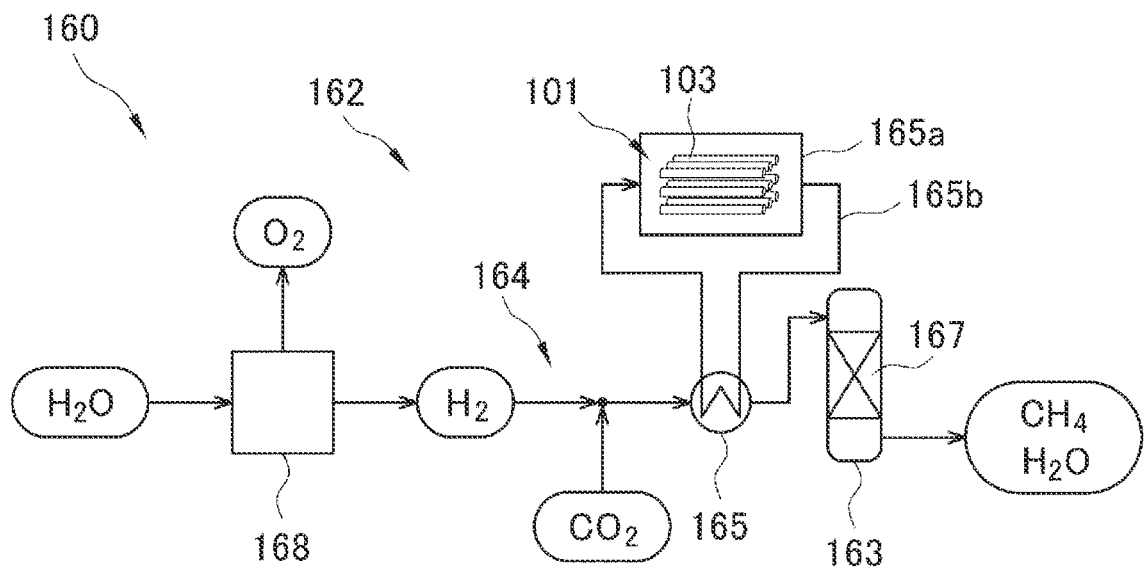
FIG. 21 is a schematic diagram showing a configuration of a heat utilization system according to a fourth embodiment.

As shown in FIG. 21, a heat utilization system 160 includes the heat generating device 101 (see FIG. 16) and a methane production device 162. Since the heat generating device 101 has the same configuration as that of the second embodiment, the description thereof will be omitted.

The methane production device 162 includes a reactor 163, a raw material gas supply line 164, and a raw material gas heater 165.

The reactor 163 has a catalyst 167 that causes the reaction between $CO_2$ and $H_2$ to proceed, which is represented by the following formula (1).

$$CO_2 + 4H_2 \rightarrow CH_4 + 2H_2O \qquad (1)$$

The catalyst 167 is not particularly limited as long as it is a catalyst that can cause the reaction between $CO_2$ and $H_2$ to proceed and generate $CH_4$. For example, a nickel (Ni)-based catalyst, a ruthenium (Ru)-based catalyst, and a platinum (Pt)-based catalyst can be used as the catalyst 167.

The raw material gas supply line 164 supplies the raw material gas containing $CO_2$ and $H_2$ to the reactor 163. In FIG. 21, the raw material gas supply line 164 forms a line through which the raw material gas containing $CO_2$ and $H_2$ flows by merging a line through which $CO_2$ circulates with a line through which $H_2$ circulates, and the raw material gas line is connected to the reactor 163.

The raw material gas supply line 164 includes an electrolysis device 168 that electrolyzes water ($H_2O$) to generate hydrogen ($H_2$) and oxygen ($O_2$). The electrolysis device 168 performs electrolysis of $H_2O$ using, for example, electricity obtained by driving the power generator 39 (see FIG. 15). $O_2$ generated by the electrolysis device 168 is mixed with $CO_2$ through the raw material gas supply line 164. $O_2$ generated by the electrolysis device 168 is supplied to, for example, the air supply line 96 (see FIG. 15) according to the third embodiment, and mixed with the combustion air. The raw material gas supply line 164 may be connected to an $H_2$ tank in which $H_2$ is stored such that $H_2$ is supplied from the $H_2$ tank.

The raw material gas supply line 164 is connected to the carbon dioxide separation and collection device 143 (see FIGS. 19 and 20) according to the third embodiment. Therefore, $CO_2$ collected by the carbon dioxide separation and collection device 143 is mixed with $H_2$ through the raw material gas supply line 164. The raw material gas supply line 164 may be connected to a $CO_2$ tank in which $CO_2$ is stored such that $CO_2$ is supplied from the $CO_2$ tank.

The raw material gas heater 165 is provided in the raw material gas supply line 164 and heats the raw material gas circulating through the raw material gas supply line 164. The raw material gas heater 165 includes an accommodation container 165a that accommodates the heat generating device 101, and a heat medium circulation unit 165b that circulates the heat medium between the inside and the outside of the accommodation container 165a. The heat medium is heated by passing through a gap formed by an inner surface of the accommodation container 165a and an outer surface of the sealed container 104 (see FIG. 16) of the heat generating device 101. The raw material gas is heated by heat exchange between the raw material gas and the heat medium. The raw material gas is heated to, for example, about 400° C.

The methane production device 162 has a catalyst 167 for producing $CH_4$ from the raw material gas containing $CO_2$ and $H_2$, and heats the raw material gas by using, as a heat source, a heat medium heated by heat of the heat generating element 105 (see FIG. 16), thereby causing $CO_2$ and $H_2$ to react. When the heated raw material gas comes into contact with the catalyst 167, the reaction between $CO_2$ and $H_2$ proceeds, and $CH_4$ is generated. $CH_4$ generated by the methane production device 162 is supplied as a synthesized natural gas (SNG) to, for example, existing infrastructure equipment. In the methane production device 162, $H_2O$ is also generated in the process of generating $CH_4$ from the raw material gas in the reactor 163. $H_2O$ generated in the reactor 163 is supplied to, for example, the electrolysis device 168.

As described above, since the heat utilization system 160 includes the heat generating device 101 (see FIG. 16) and the methane production device 162, the heat generating element 105 is used as a heat source for generating $CH_4$ from the raw material gas containing $CO_2$ and $H_2$, and thus the amount of $CO_2$ discharging into the atmosphere can be reduced as compared with a case where a combustion device is used as a heat source.

Further, in the heat utilization system 160, $CO_2$ contained in the exhaust gas discharged from the combustion device is supplied to the methane production device 162, and thus $CO_2$ is converted to $CH_4$, so that the discharging amount of $CO_2$ is further reduced.

In the fourth embodiment, the heat generating element 105 is used as the heat source for generating $CH_4$ from the raw material gas containing $CO_2$ and $H_2$. However, in an IS cycle in which hydrogen is produced from water using thermal energy or an ISN cycle in which ammonia ($NH_3$) is produced from water and nitrogen ($N_2$) using thermal energy, a heat medium heated to, for example, about 800° C. by the heat of the heat generating element 105 can be used as a heat source. In the IS cycle, water, iodine (I), and sulfur (S) are reacted to produce hydrogen iodide (HI), and the hydrogen iodide is thermally decomposed to produce hydrogen. As a heat source for thermally decomposing hydrogen iodide, a heat medium heated by the heat of the heat generating element 105 can be used as a heat source. In the ISN cycle, nitrogen is reacted with hydrogen iodide produced in the IS cycle to produce ammonium iodide ($NH_4I$), and the ammonium iodide is thermally decomposed to produce ammonia. As a heat source for thermally decomposing the ammonium iodide, a heat medium heated by the heat of the heat generating element 105 can be used as a heat source.

5. Modification

The invention is not limited to the above-described embodiments, and can be appropriately modified within the scope of the gist of the invention.

A fin for improving heat exchange efficiency may be provided in a sealed container accommodating a heat generating structure. A sealed container including a fin will be described with reference to FIGS. 22 to 24.

Figure 22:
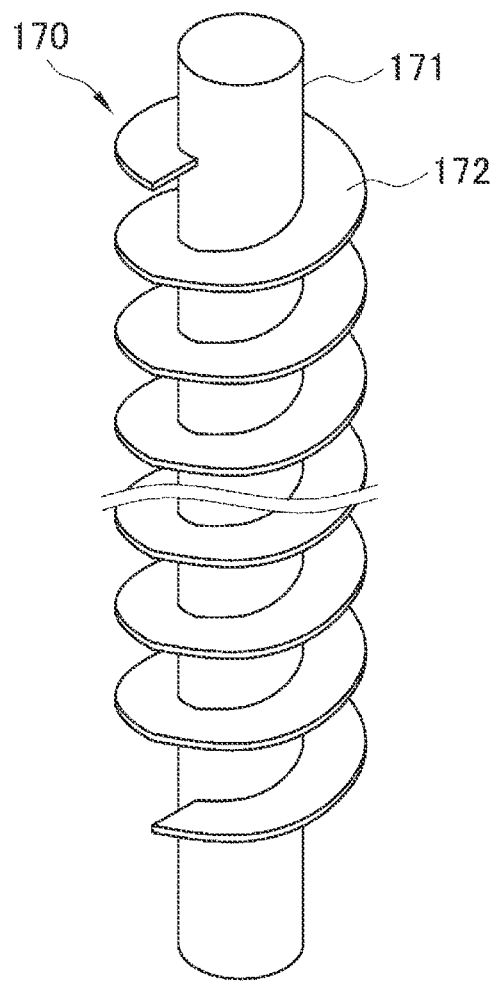
FIG. 22 is a perspective view of a sealed container including a fin.

As shown in FIG. 22, a sealed container 170 includes a container body 171 having a space therein, and a fin 172 provided on an outer surface of the container body 171. The sealed container 170 accommodates a heat generating structure 173 having a plurality of heat generating elements 55 (see FIG. 23). A configuration of the sealed container 170 described below is an example of a configuration required when an internal temperature of the sealed container 170 is maintained at 600° C. to 800° C., the heat generating structure 173 includes 48 heat generating elements 55, and output of each heat generating element 55 is 20 W.

The container body 171 is formed in a tubular shape. Although the container body 171 has a cylindrical outer shape in FIG. 22, the container body 171 may have various shapes such as an elliptic cylindrical shape and a square tubular shape. A length of the container body 171 is, for example, 250 mm. A diameter of the container body 171 is, for example, 80 mm. When the container body 171 has an elliptic cylindrical shape, the diameter of the container body 171 means a major axis thereof. When the container body 171 has a square tubular shape, the diameter of the container body 171 means a diameter of a circumscribed circle thereof.

The container body 171 is preferably made of a material having a melting point of 1000° C. or higher and a thermal conductivity of 50 W/m·K or more. As the material of the container body 171, for example, copper, nickel, or tungsten is used. When the material of the container body 171 is copper, a thickness of the container body 171 is preferably 0.5 mm or more, and more preferably 1 mm or more. When the material of the container body 171 is nickel or tungsten, the thickness of the container body 171 is preferably 0.25 mm or more, and more preferably 0.5 mm or more. It is also possible to use gold and silver as the material of the container body 171, whereas copper, nickel, and tungsten are preferred since copper, nickel, and tungsten are inexpensive. When a temperature inside the sealed container 170 is maintained at lower than 600° C., iron may be used as the material of container body 171.

The fin 172 is spirally provided on an outer peripheral surface of the container body 171. The number of turns of the fin 172 is, for example, 20. The fin 172 is formed in a belt shape. A width of the fin 172 is, for example, 20 mm. Therefore, the diameter of the sealed container 170 is 120 mm. An interval (pitch) between the fin 172 along a longitudinal direction of the container body 171 is preferably 100 mm or less, and more preferably 50 mm or less. A heat transfer area of the fin 172 is preferably 0.1 m²/kW or more. As the material of the fin 172, for example, the same material as the material of the container body 171, that is, copper, nickel, tungsten, or the like can be used. Aluminum may be used as the material of the fin 172.

Figure 23:
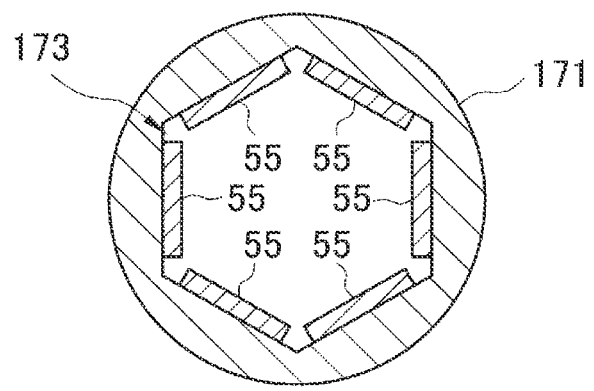
FIG. 23 is a cross-sectional view of a container body of the sealed container including the fin taken in a radial direction.

FIG. 23 is a cross-sectional view of the container body 171 taken in a radial direction. As shown in FIG. 23, a plurality of heat generating elements 55 are arranged in contact with an inner surface of the container body 171. The inner surface of the container body 171 is constituted by a plurality of flat surfaces. In FIG. 23, the inner surface of the container body 171 is constituted by six flat surfaces. That is, a cross-sectional shape of a hollow portion of the container body 171 is hexagonal. The six heat generating elements 55 arranged on planes along the circumferential direction of the container body 171 face each other. A predetermined number of a plurality of heat generating elements 55 facing each other constitutes one set. In this example, six heat generating elements 55 constitute one set.

Figure 24:
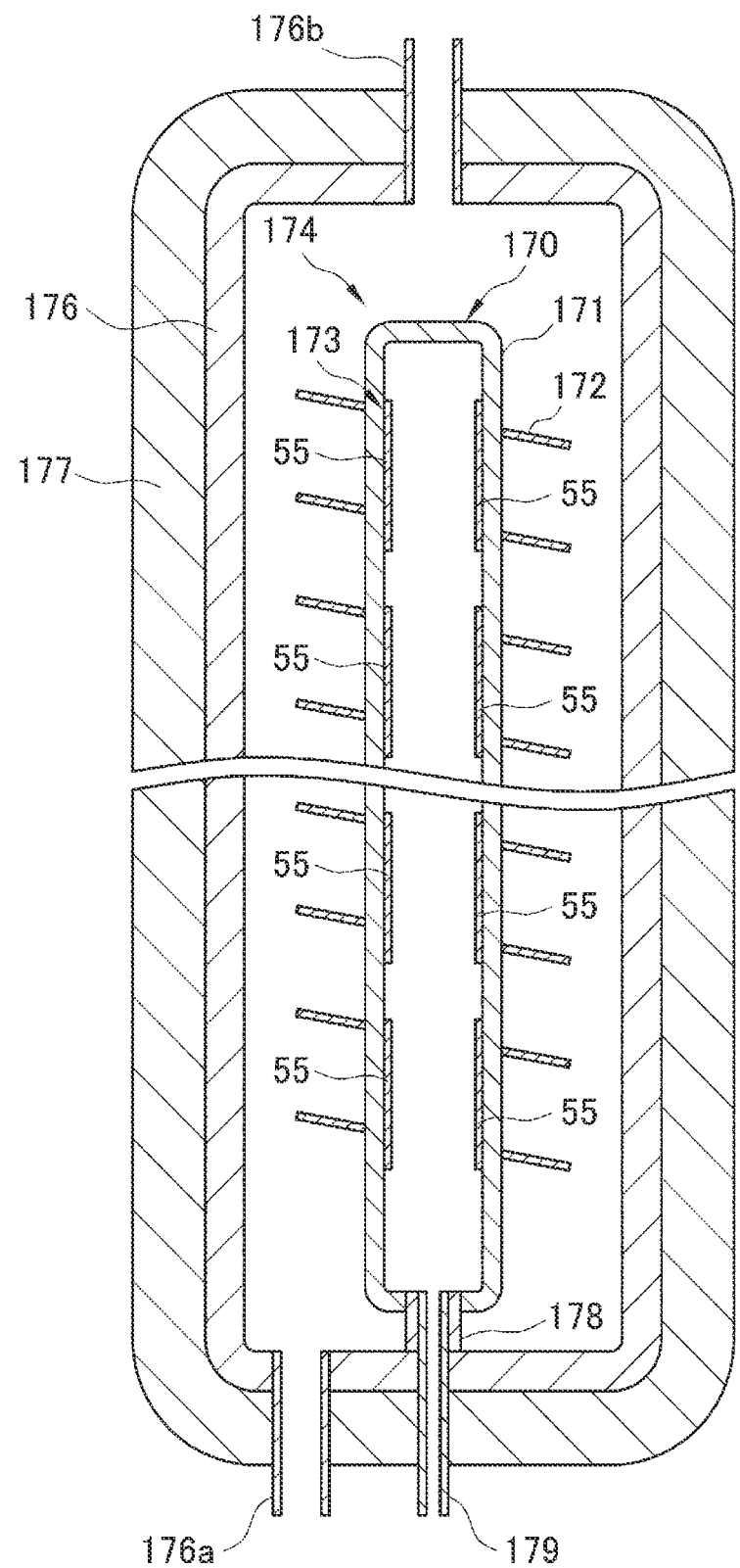
FIG. 24 is a cross-sectional view of the container body of the sealed container including the fin taken in a direction orthogonal to the radial direction.

FIG. 24 is a cross-sectional view of the container body 171 taken in a direction orthogonal to the radial direction. As shown in FIG. 24, the plurality of heat generating elements 55 are arranged along the longitudinal direction of the container body 171 on each plane constituting the inner surface of the container body 171. In this example, eight heat generating elements 55 are arranged at equal intervals along the longitudinal direction of the container body 171 with respect to one plane. That is, eight sets of heat generating elements 55 are arranged along the longitudinal direction of the container body 171.

The sealed container 170 and the heat generating structure 173 constitute a heat generating element unit 174. The heat generating element unit 174 has a cylindrical shape as a whole. The heat generating element unit 174 is accommodated in an accommodation container 176 having a space therein. The accommodation container 176 has an inflow port 176a through which the heat medium flows in, and an outflow port 176b through which the heat medium flows out. In FIG. 24, in the accommodation container 176, the inflow port 176a is provided at one end in the longitudinal direction of the container body 171 of the heat generating element unit 174, and the outflow port 176b is provided at the other end in the longitudinal direction of the container body 171 of the heat generating element unit 174. The heat medium flowing in through the inflow port 176a moves spirally along the fin 172 of the sealed container 170 and flows out through the outflow port 176b. The accommodation container 176 is covered with a heat insulating material 177. As the heat medium, a gas having low reactivity and corrosiveness or a gas that does not aggregate or thermally decompose is used. The heat medium is preferably, for example, water vapor, air, a nitrogen gas, an argon gas, a helium gas, a xenon gas, a carbon dioxide gas, a chlorofluorocarbon gas, or a mixed gas thereof.

In FIG. 24, the sealed container 170 is connected to a hydrogen-based gas supply and exhaust header 178. The hydrogen-based gas supply and exhaust header 178 is connected to a hydrogen pipe 179. Accordingly, the supply and the exhaust of the hydrogen-based gas are repeatedly performed. The heat generating element unit 174 may be replaceable by detachably attaching the sealed container 170 and the hydrogen-based gas supply and exhaust header 178.

As described above, since the heat generating element unit 174 includes the fin 172, it is possible to increase a contact area with the heat medium, and thus it is possible to improve the heat exchange efficiency between the heat generating structure 173 and the heat medium.

In the heat generating element unit 174, since the fin 172 is provided in a spiral shape on the outer peripheral surface of the container body 171, the heat medium can be moved in the spiral shape along the fin 172, and thus a contact time with the heat medium is increased, and the heat of the heat generating structure 173 can be reliably transferred to the heat medium.

The inner surface of the container body 171 is constituted by six flat surfaces, whereas the number of flat surfaces constituting the inner surface can be appropriately changed. For example, the inner surface of the container body 171 may be formed of eight flat surfaces, and the cross-sectional shape of the hollow portion of the container body 171 may be octagonal.

The accommodation container 176 may be constituted to accommodate a plurality of heat generating element units 174. For example, seven heat generating element units 174 can be accommodated inside the accommodation container 176. For example, when a large number of heat generating element units 174, which exceeds 20, are accommodated in the accommodation container 176, it is preferable to change positions of the inflow port 176a and the outflow port 176b such that the heat medium flows in a direction orthogonal to the longitudinal direction of the container body 171 of the heat generating element unit 174.

In the sealed container 170, the plurality of heat generating elements 55 are brought into contact with the inner surface of the container body 171, and the heat generated by the plurality of heat generating elements 55 is directly transferred to the container body 171. However, a heat transfer support portion may be provided to support the plurality of heat generating elements 55 away from the inner surface of the container body 171 and to transfer the heat generated by the plurality of heat generating elements 55 to the container body 171.

Figure 25:
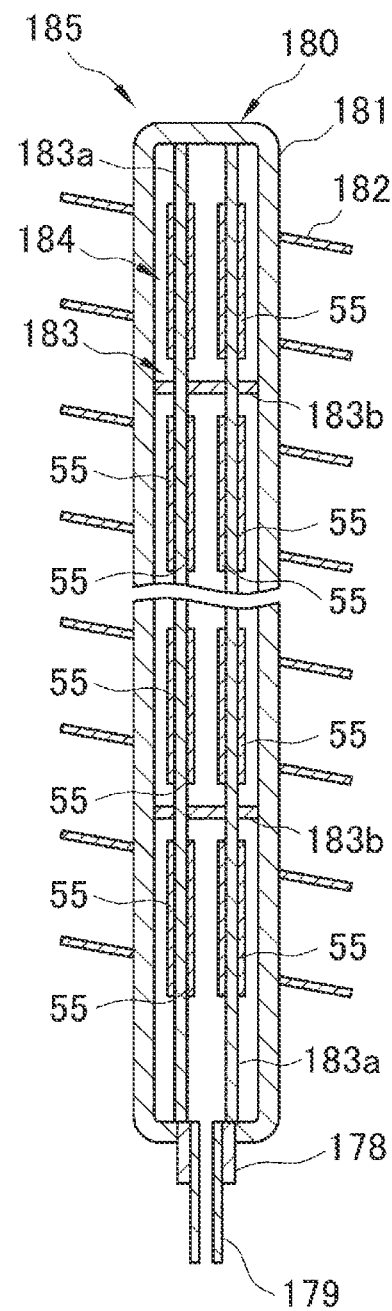
FIG. 25 is a cross-sectional view of a sealed container including a heat transfer support portion.

As shown in FIG. 25, a sealed container 180 includes a container body 181, a fin 182, and a heat transfer support portion 183. The sealed container 180 accommodates a heat generating structure 184 including a plurality of heat generating elements 55. The container body 181 has the same configuration as the container body 171 except that the cross-sectional shape of the hollow portion is circular. That is, an inner surface of the container body 181 is made of a curved surface. The fin 182 has the same configuration as the fin 172. Description of the container body 181 and the fin 182 will be omitted. The sealed container 180 and the heat generating structure 184 constitute a heat generating element unit 185. The heat generating element unit 185 has a cylindrical shape as a whole. For example, instead of the heat generating element unit 174 (see FIG. 24), the heat generating element unit 185 is accommodated in the accommodation container 176. FIG. 25 is a cross-sectional view of the sealed container 180 taken in a direction orthogonal to the radial direction.

The heat transfer support portion 183 is provided inside the container body 181, supports the plurality of heat generating elements 55, and transfers heat generated by the plurality of heat generating elements 55 to the container body 181. The heat transfer support portion 183 includes a support pillar 183a that supports the plurality of heat generating elements 55, and a bridge 183b that connects the support pillar 183a and the container body 181. In this example, the heat generating element 55 of 10 W is used.

The heat transfer support portion 183 includes at least one or more support pillars 183a and at least one or more bridges 183b. In this example, the heat transfer support portion 183 includes four support pillars 183a and three bridges 183b. The four support pillars 183a are arranged at predetermined intervals from each other. Each support pillar 183a extends along the longitudinal direction of the container body 181, and both ends thereof are fixed to the container body 181 by a fixing member (not shown). The three bridges 183b are arranged at predetermined intervals along the longitudinal direction of each support pillar 183a. Each bridge 183b is formed in, for example, a plate shape, and connects each support pillar 183a and the container body 181 by a fixing member (not shown).

Figure 26:
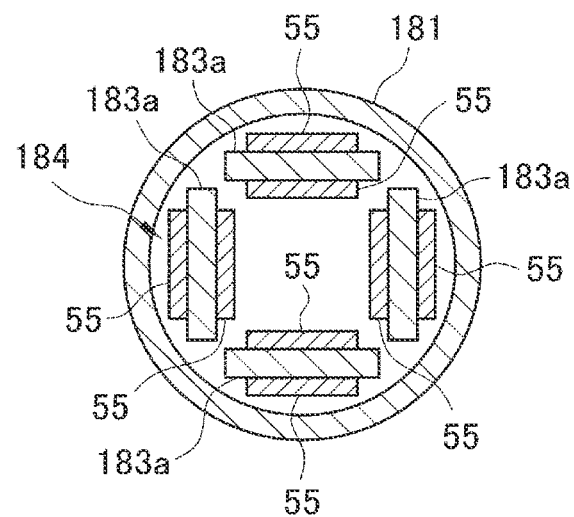
FIG. 26 is a cross-sectional view of the container body of the sealed container including the heat transfer support portion taken in the radial direction.

FIG. 26 is a cross-sectional view of the container body 181 taken in the radial direction. As shown in FIG. 26, each support pillar 183a is formed in a prism shape. In this example, the support pillar 183a has a quadrangular prism shape having a rectangular cross section. The support pillars 183a are arranged such that specific surfaces thereof face each other. That is, the four support pillars 183a are arranged in a square tubular shape. The specific surface of each support pillar 183a is referred to as a front surface. A surface opposite to the specific surface is referred to as a back surface. The back surface of each support pillar 183a faces the inner surface of the container body 181. Each support pillar 183a supports the heat generating element 55 on at least one of the front surface and the back surface. In FIG. 26, the heat generating element 55 is supported on both surfaces (the front surface and the back surface) of each support pillar 183a. 12 heat generating elements 55 are supported by one support pillar 183a. Each of the heat generating elements 55 is not in contact with the inner surface of the container body 181 and is separated from the inner surface of the container body 181.

As the material of the heat transfer support portion 183, that is, the material of the support pillar 183a and the bridge 183b, for example, the same material as that of the container body 181 can be used. A thickness of the support pillar 183a and the bridge 183b is preferably 1 mm or more when the support pillar 183a and the bridge 183b are made of copper, is preferably 4.4 mm or more when the support pillar 183a and the bridge 183b are made of nickel, and is preferably 2 mm or more when the support pillar 183a and the bridge 183b are made of tungsten. When the heat transfer support portion 183 is made of the above-described material and has various dimensions, heat generated by the heat generating element 55 can be transferred to the container body 181 and the fin 182 via the support pillar 183a and the bridge 183b. Even when the temperature of the heat generating element 55 instantaneously rises, the heat transfer support portion 183 is prevented from melting and being damaged. Instead of supporting the heat generating element 55 of 10 W on both surfaces of each support pillar 183a as described above, for example, when the heat generating element 55 of 20 W is supported on both surfaces of each support pillar 183a or when the heat generating element 55 of 40 W is supported on the front surface or the back surface of each support pillar 183a, it is preferable to change various dimensions. For example, the thickness of the support pillar 183a and the bridge 183b is preferably 2 mm or more when the support pillar 183a and the bridge 183b are made of copper, is preferably 8.4 mm or more when the support pillar 183a and the bridge 183b are made of nickel, and is preferably 4 mm or more when the support pillar 183a and the bridge 183b are made of tungsten.

As described above, since the heat generating element unit 185 includes the heat transfer support portion 183, the heat generated by the heat generating body 55 can be efficiently transferred to the container body 181 and the fin 182, and thus the heat exchange efficiency between the heat generating structure 184 and the heat medium can be improved.

The heat transfer support portion 183 includes four support pillars 183a, whereas the number of support pillars 183a may be appropriately changed. For example, one support pillar 183a may be arranged at a center of the container body 181, or six support pillars 183a may be arranged in a hexagonal tubular shape. The heat transfer support portion 183 includes three bridges 183b, whereas the number of the bridges 183b can be appropriately changed.

The heat transfer support portion 183 may be provided inside the container body 171 having a flat inner surface. Accordingly, the plurality of heat generating elements 55 are arranged on each plane constituting the inner surface of the container body 171, and the plurality of heat generating elements 55 are supported by the heat transfer support portion 183, so that the number of heat generating elements 55 can be increased.

The heat generating element units 174 and 185 are cylindrical, whereas the heat generating element units may have a flat plate shape.

Figure 27:
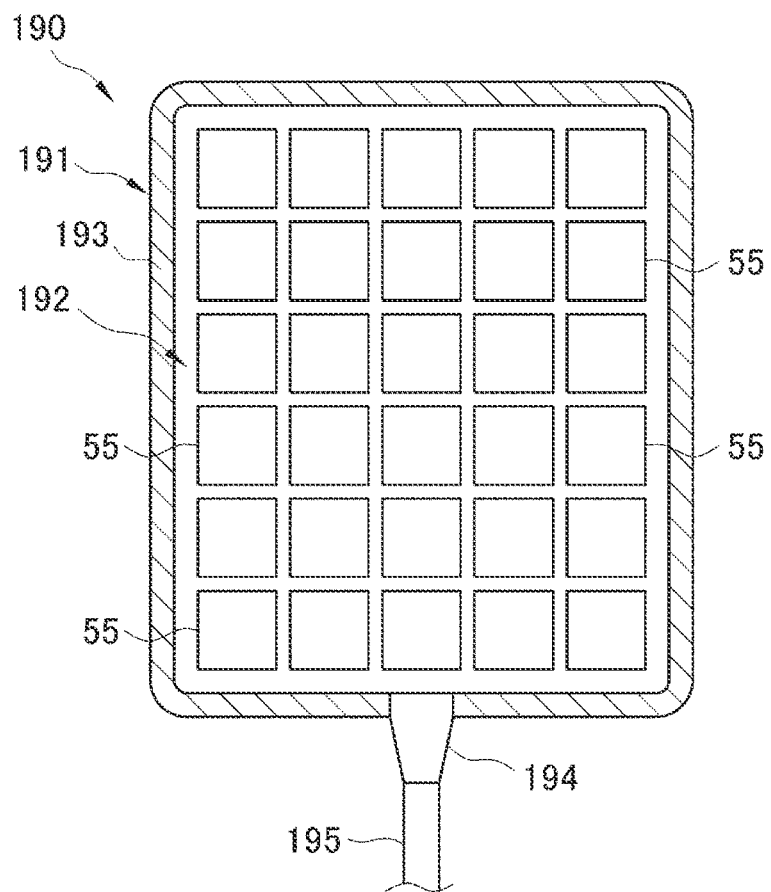
FIG. 27 is a cross-sectional view of a flat-plate-shaped heat generating element unit taken in a direction orthogonal to a thickness direction thereof.

As shown in FIG. 27, a heat generating element unit 190 includes a sealed container 191 to which a hydrogen-based gas is supplied, and a heat generating structure 192 accommodated in the sealed container 191. The heat generating element unit 190 has, for example, a flat plate shape having a vertical length of 800 mm, a horizontal length of 600 mm, and a thickness of 15 mm. FIG. 27 is a cross-sectional view of the flat-plate-shaped heat generating element unit 190 taken in a direction orthogonal to the thickness direction.

The sealed container 191 includes a container body 193 having a space therein. The container body 193 is formed in a flat plate shape. In this example, a cross-sectional shape of a hollow portion is quadrangular. The heat generating structure 192 includes a plurality of heat generating elements 55, and is formed of 60 heat generating elements 55 in this example.

The container body 193 is connected to a hydrogen-based gas supply and exhaust header 194. The hydrogen-based gas supply and exhaust header 194 is connected to a hydrogen pipe 195. Accordingly, the supply and the exhaust of the hydrogen-based gas are repeatedly performed.

Figure 28:
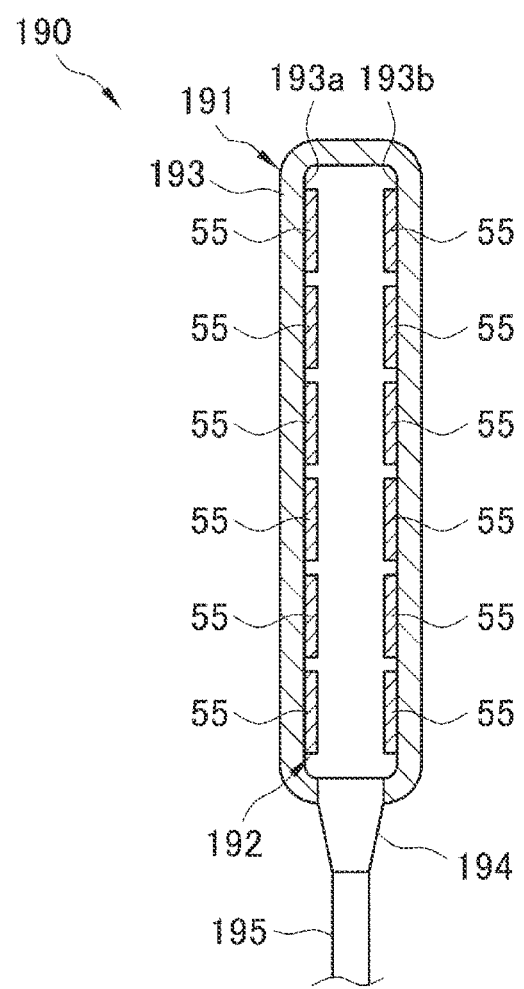
FIG. 28 is a cross-sectional view of the flat-plate-shaped heat generating element unit taken in the thickness direction.

FIG. 28 is a cross-sectional view of the flat-plate-shaped heat generating element unit 190 taken in the thickness direction. As shown in FIG. 28, the container body 193 has a first inner surface 193a and a second inner surface 193b facing the first inner surface 193a. The plurality of heat generating elements 55 are arranged in contact with the first inner surface 193a and the second inner surface 193b. In this example, among 60 heat generating elements 55, 30 heat generating elements 55 are arranged on the first inner surface 193a, and 30 heat generating elements 55 are arranged on the second inner surface 193b. The heat generating elements 55 arranged on the first inner surface 193a and the heat generating elements 55 arranged on the second inner surface 193b face each other.

Figure 29:
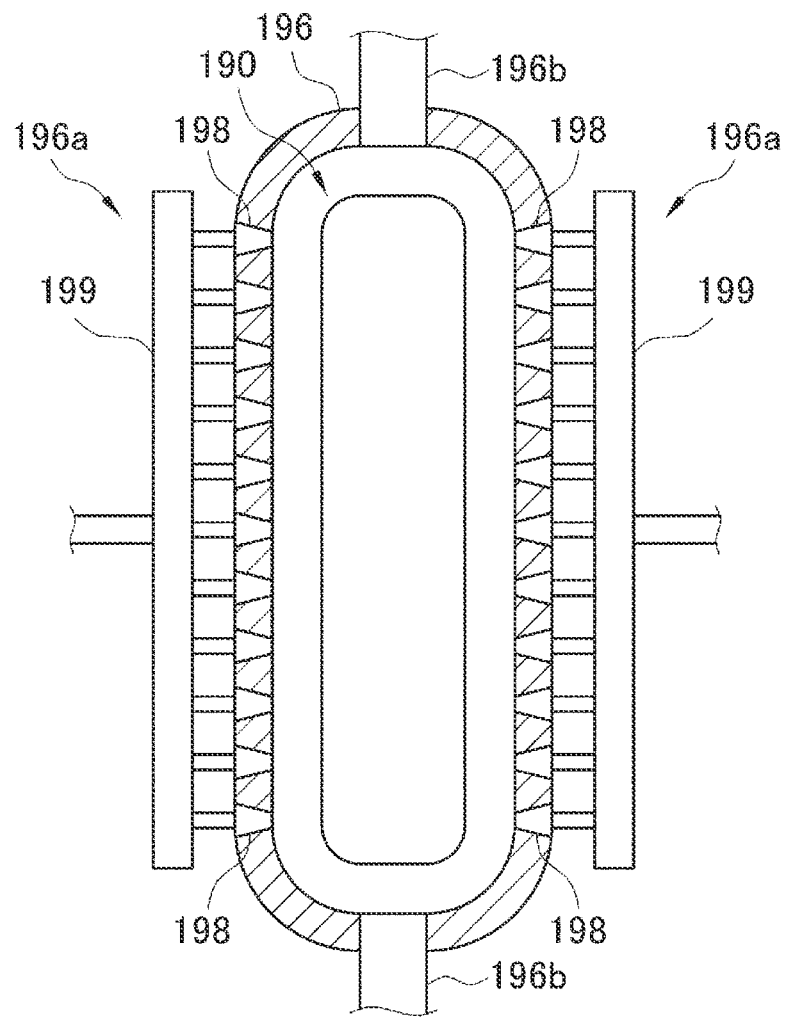
FIG. 29 is an explanatory diagram showing a state where the flat-plate-shaped heat generating element unit is accommodated in an accommodation container.

As shown in FIG. 29, the heat generating element unit 190 is accommodated in an accommodation container 196 having a space therein. An outer shape of the accommodation container 196 is, for example, similar to that of the container body 193. Although a case where one heat generating element unit 190 is accommodated in one accommodation container 196 is described as an example, a plurality of heat generating element units 190 may be accommodated in one accommodation container 196.

The accommodation container 196 is provided with a nozzle portion 196a for injecting the heat medium and an outflow port 196b through which the heat medium flows out. The nozzle portion 196a sprays the heat medium onto the surface of the heat generating element unit 190 by spraying the heat medium from a tip end. The accommodation container 196 is provided with at least one nozzle portion 196a and at least one outflow port 196b. In FIG. 29, the nozzle portion 196a is provided in each of two wall portions facing the heat generating element unit 190, and the outflow port 196b is provided in each of two wall portions different from the wall portion in which each nozzle portion 196a is provided.

The nozzle portion 196a includes an injection portion 198 that injects the heat medium, and a piping portion 199 that is connected to the injection portion 198. The injection portion 198 is provided at the tip end of the nozzle portion 196a. The piping portion 199 guides the heat medium to the injection portion 198. The heat medium injected from the injection portion 198 and blown onto the heat generating element unit 190 flows out of the accommodation container 196 through the outflow port 196b. In FIG. 29, each of the nozzle portions 196a has 11 injection portions 198.

As described above, the heat generating element unit 190 can be formed by forming the container body 193 of the sealed container 191 in a flat plate shape and arranging the plurality of heat generating elements 55 on the first inner surface 193a and the second inner surface 193b of the container body 193. Therefore, the production is easy and the production cost can be reduced.

The heat generating element unit 190 has a configuration in which the sealed container 191 includes the container body 193, whereas a fin may be provided on the outer surface of the container body 193.

Figure 30:
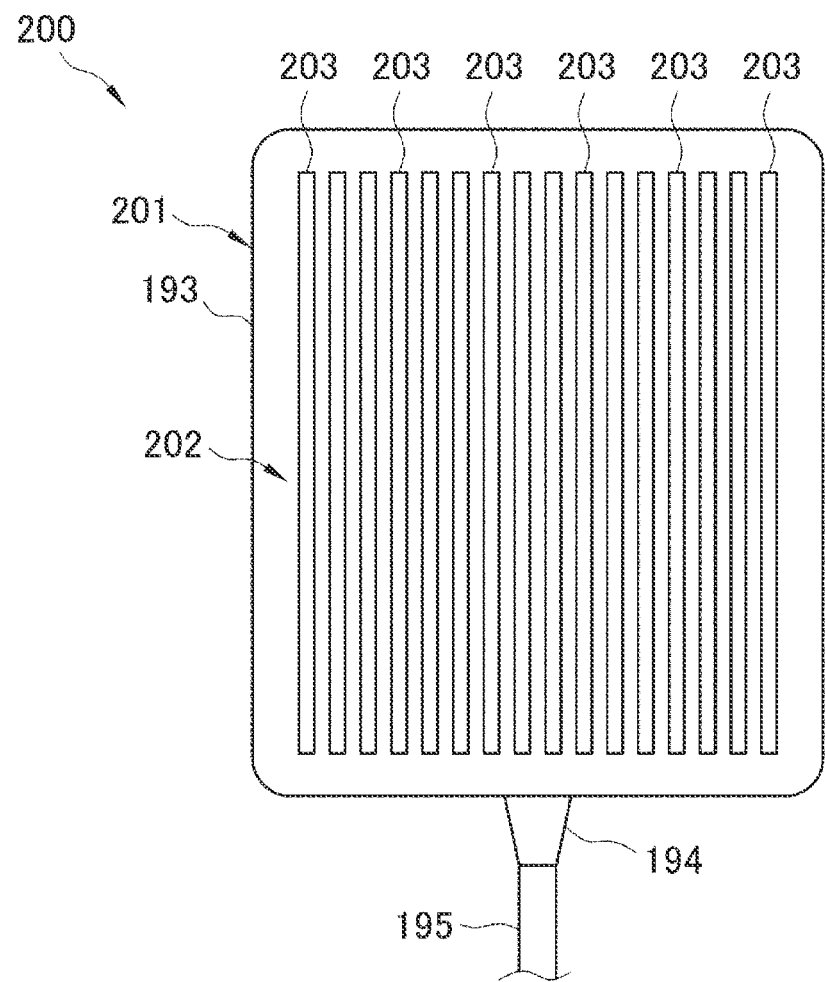
FIG. 30 is a plan view of a sealed container including a fin and formed by a plurality of ribs.

As shown in FIG. 30, a heat generating element unit 200 includes a sealed container 201 instead of the sealed container 191 of the heat generating element unit 190. The sealed container 201 includes the container body 193 and a fin 202 provided on the outer surface of the container body 193. The sealed container 201 includes at least one fin 202. The fin 202 is formed by a plurality of ribs 203. FIG. 30 is a plan view of the sealed container 201 formed by the plurality of ribs 203. The heat generating structure 192 (see FIGS. 27 and 28) is accommodated in the sealed container 201. That is, the heat generating element unit 200 includes the sealed container 201 to which a hydrogen-based gas is supplied, and the heat generating structure 192 accommodated in the sealed container 201.

Figure 31:
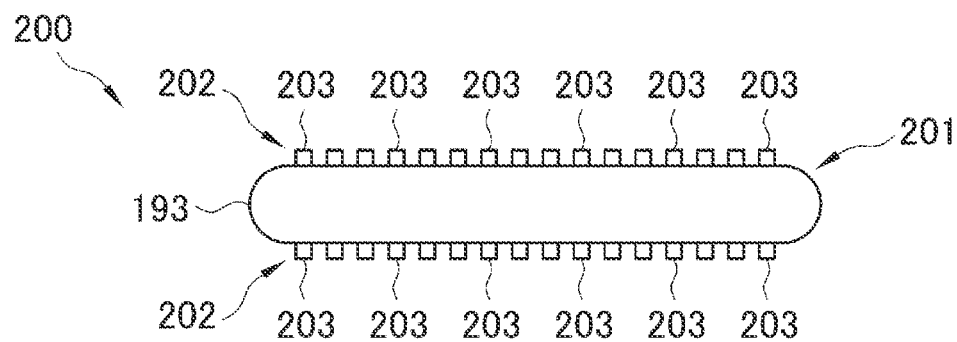
FIG. 31 is a side view of the sealed container including the fin and formed by the plurality of ribs.

FIG. 31 is a side view of the sealed container 201 including the fin 202 formed by the plurality of ribs 203. As shown in FIG. 31, the fin 202 is provided on two surfaces of the outer surface of the container body 193 facing each other. The plurality of ribs 203 protrude from the outer surface of the container body 193. In this example, 16 ribs 203 are provided on each of two surfaces facing each other on the outer surface of the container body 193.

The heat generating element unit 200 including the fin 202 is accommodated in, for example, the accommodation container 176 (see FIG. 24), the accommodation container 196 (see FIG. 29) provided with the nozzle portion 196a, or the like. For example, when the heat generating element unit 200 including the fin 202 is accommodated in the accommodation container 196, it is preferable to arrange the heat generating element unit 200 such that the longitudinal direction of the plurality of ribs 203 coincides with the circulation direction of the heat medium. Since the heat generating element unit 200 includes the fin 202, it is possible to increase the contact area with the heat medium, and thus it is possible to improve the heat exchange efficiency between the heat generating structure 192 and the heat medium.

A plurality of accommodation containers 176 and a plurality of accommodation containers 196 may be prepared and connected in series. Since the number of the heat generating element units 190 and the number of the heat generating element units 200 are increased, the output can be improved.

The heat generating element unit 174 shown in FIG. 24, the heat generating element unit 185 shown in FIG. 25, the heat generating element unit 190 shown in FIG. 27, and the heat generating element unit 200 shown in FIG. 30 can be used in the heat generating device 101 instead of the heat generating element unit 103 shown in FIG. 16.

REFERENCE SIGN LIST

- 10, 90, 140, 160 heat utilization system
- 11, 101 heat generating device
- 12, 102 heat utilization device
- 15, 104, 170, 180, 191, 201 sealed container
- 20, 106, 173, 184, 192 heat generating structure
- 21 heater
- 31, 147a, 165a, 176, 196 accommodation container
- 32, 147b, 165b heat medium circulation unit
- 33 gas turbine
- 34 steam generator
- 35 steam turbine
- 36 Stirling engine
- 37 thermoelectric converter
- 38, 39, 40 power generator
- 55, 75, 80, 85, 86, 105 heat generating element
- 66 base
- 67 multilayer film
- 71 first layer
- 72 second layer
- 77 third layer
- 82 fourth layer
- 125 combustion air circulation line
- 126 flow rate variable circulation fan
- 127 circulation flow rate control unit
- 142 boiler (combustion device)
- 143 carbon dioxide separation and collection device
- 162 methane production device
- 167 catalyst
- 171, 181, 193 container body
- 172, 182, 202 fin
- 183 heat transfer support portion
- 203 rib

The invention claimed is:

1. A heat utilization system comprising:
a sealed container into which a hydrogen-based gas is supplied;
a heat generating structure that is accommodated in the sealed container and includes a heat generating element that is configured to generate heat by occluding and discharging hydrogen contained in the hydrogen-based gas; and
a heat utilization device that utilizes, as a heat source, a heat medium heated by the heat of the heat generating element, wherein
the heat generating element includes a base made of a hydrogen storage metal, a hydrogen storage alloy, or a proton conductor, and a multilayer film provided on the base, and
the multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm, and
the heat generating structure includes a plurality of heat generating elements including the heat generating element, the plurality of heat generating elements are radially arranged.

2. The heat utilization system according to claim 1, wherein
the first layer is made of any one of Ni, Pd, Cu, Mn, Cr, Fe, Mg, Co, and an alloy thereof, and
the second layer is made of any one of Ni, Pd, Cu, Mn, Cr, Fe, Mg, Co, an alloy thereof, and SiC.

3. The heat utilization system according to claim 1, wherein
the multilayer film has a third layer made of a hydrogen storage metal, a hydrogen storage alloy, or ceramics different from those of the first layer and the second layer and having a thickness of less than 1000 nm, in addition to the first layer and the second layer.

4. The heat utilization system according to claim 3, wherein
the third layer is made of any one of CaO, $Y_2O_3$, TiC, $LaB_6$, SrO, and BaO.

5. The heat utilization system according to claim 4, wherein
the multilayer film has a fourth layer made of a hydrogen storage metal or a hydrogen storage alloy different from those of the first layer, the second layer, and the third layer and having a thickness of less than 1000 nm, in addition to the first layer, the second layer, and the third layer.

6. The heat utilization system according to claim 5, wherein
the fourth layer is made of any one of Ni, Cu, Cr, Fe, Mg, Co, an alloy thereof, SiC, Cao, $Y_2O_3$, TiC, $LaB_6$, SrO, and BaO.

7. A heat utilization system comprising:
a sealed container into which a hydrogen-based gas is supplied;
a heat generating structure that is accommodated in the sealed container and includes a heat generating element that is configured to generate heat by occluding and discharging hydrogen contained in the hydrogen-based gas; and
a heat utilization device that utilizes, as a heat source, a heat medium heated by the heat of the heat generating element, wherein
the heat generating element includes a base made of a hydrogen storage metal, a hydrogen storage alloy, or a proton conductor, and a multilayer film provided on the base,
the multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm, and
the heat generating structure includes a plurality of heat generating elements including the heat generating element, the plurality of heat generating elements are arranged in a line with a gap therebetween.

8. A heat utilization system comprising:
a sealed container into which a hydrogen-based gas is supplied;
a heat generating structure that is accommodated in the sealed container and includes a heat generating element that is configured to generate heat by occluding and discharging hydrogen contained in the hydrogen-based gas; and a heat utilization device that utilizes, as a heat source, a heat medium heated by the heat of the heat generating element, wherein the heat generating element includes a base made of a hydrogen storage metal, a hydrogen storage alloy, or a proton conductor, and a multilayer film provided on the base, the multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm, and the heat utilization system includes a plurality of heat generating structures including the heat generating structure, the plurality of heat generating structures are arranged in a direction in which the hydrogen-based gas flows inside the sealed container.

9. A heat utilization system comprising:

a sealed container into which a hydrogen-based gas is supplied;

a heat generating structure that is accommodated in the sealed container and includes a heat generating element that is configured to generate heat by occluding and discharging hydrogen contained in the hydrogen-based gas;

a heater that is accommodated in the sealed container and formed in a tubular shape; and a heat utilization device that utilizes, as a heat source, a heat medium heated by the heat of the heat generating element, wherein the heat generating element includes a base made of a hydrogen storage metal, a hydrogen storage alloy, or a proton conductor, and a multilayer film provided on the base, the multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm, and the heat generating structure is arranged in a space formed by an inner surface of the heater.

10. A heat utilization system comprising:

a sealed container into which a hydrogen-based gas is supplied;

a heat generating structure that is accommodated in the sealed container and includes a heat generating element that is configured to generate heat by occluding and discharging hydrogen contained in the hydrogen-based gas; and a heat utilization device that utilizes, as a heat source, a heat medium heated by the heat of the heat generating element, wherein the heat generating element includes a base made of a hydrogen storage metal, a hydrogen storage alloy, or a proton conductor, and a multilayer film provided on the base, the multilayer film has a first layer made of a hydrogen storage metal or a hydrogen storage alloy and having a thickness of less than 1000 nm and a second layer made of a hydrogen storage metal or a hydrogen storage alloy, which is different from that of the first layer, or ceramics and having a thickness of less than 1000 nm, the heat utilization device includes an accommodation container that accommodates the sealed container, and the heat medium is heated by passing through a gap formed by an inner surface of the accommodation container and an outer surface of the sealed container.

11. The heat utilization system according to claim 10, wherein the heat utilization device includes a heat medium circulation unit that is configured to circulate the heat medium between an inside and an outside of the accommodation container.

12. The heat utilization system according to claim 11, wherein the heat utilization device includes at least one of a gas turbine, a steam turbine, a Stirling engine, and a thermoelectric converter.

* * * * *